(12) United States Patent
Triplett et al.

(10) Patent No.: US 7,056,188 B1
(45) Date of Patent: Jun. 6, 2006

(54) ROCK SAW

(75) Inventors: Kevin R. Triplett, Parker, CO (US); Mark C. Adamson, Wheat Ridge, CO (US); Steven J. Erickson, Littleton, CO (US); Mark W. Sneddon, Thornton, CO (US)

(73) Assignee: Robinson Brick Company, Denver, CO (US)

( * ) Notice: Subject to any disclaimer, the term of this patent is extended or adjusted under 35 U.S.C. 154(b) by 96 days.

(21) Appl. No.: 10/629,412

(22) Filed: Jul. 29, 2003

Related U.S. Application Data

(60) Provisional application No. 60/399,340, filed on Jul. 29, 2002.

(51) Int. Cl.
*B24B 49/16* (2006.01)
*B28D 1/04* (2006.01)

(52) U.S. Cl. .......................... 451/5; 125/13.01
(58) Field of Classification Search ............. 125/13.01, 125/13.03, 14, 12; 451/5, 8, 10
See application file for complete search history.

(56) References Cited

U.S. PATENT DOCUMENTS

| 2,460,386 A | 2/1949 | Hillquist |
| 2,693,056 A | 11/1954 | Gagne |
| 3,136,098 A * | 6/1964 | Backer .................. 451/26 |
| 3,547,096 A * | 12/1970 | Angelo ............... 125/13.01 |
| 3,738,349 A | 6/1973 | Cooper et al. |
| 3,748,789 A | 7/1973 | Wada et al. |

(Continued)

FOREIGN PATENT DOCUMENTS

| DE | 4021302 A1 | 7/1990 |
| DE | 40 21 302 A1 | 1/1992 |
| GB | 0842982 | * 8/1960 .............. 125/13.01 |

OTHER PUBLICATIONS

Park Industries Diamond Saw Line Catalog. (of Models) P.O. Box 188, St. Cloud, MN 56302. Python (30103), Eagle (30096), Jaguar (30100), Predator (30097).

(Continued)

*Primary Examiner*—Robert A. Rose
(74) *Attorney, Agent, or Firm*—Margaret Polson; Patent Law Offices of Rick Martin, P.C.

(57) ABSTRACT

The present invention discloses an automated rock saw having a saw motor load sensor to control the speed of the conveyors bringing the rock to the saw blade. As the saw motor works harder to cut a given rock, the controller automatically slows the conveyor belts, reducing the load on the saw blade. If the saw blade is easily cutting a given rock and not working at optimum speed, the conveyors will be sped up, increasing production. Also provided in an alternate embodiment is a horizontal blade that can be moved into place to cut the "bottom" of a corner piece, then the standard, vertical blade cuts the other side of the corner.

8 Claims, 20 Drawing Sheets

U.S. PATENT DOCUMENTS

| | | | |
|---|---|---|---|
| 4,107,883 A | * | 8/1978 | Bein .......................... 451/14 |
| 4,741,577 A | | 5/1988 | Sato et al. |
| 5,085,008 A | * | 2/1992 | Jennings et al. ............ 451/184 |
| 5,575,538 A | | 11/1996 | Gilbert et al. |
| 5,690,092 A | | 11/1997 | Ogyu |
| 6,073,621 A | | 6/2000 | Cetrangolo |
| 6,152,804 A | | 11/2000 | Okuyama |
| 6,547,337 B1 | | 4/2003 | Welch, Jr. |
| 6,550,544 B1 | | 4/2003 | Saf |

OTHER PUBLICATIONS

Sawing Systems, Inc. Catalog (SS1-106) of Models P.O. Box 3754 Knoxville, TN 37927 Model 551 Series Saws, Model 541 Series Saws, Model 531 Series Saws, Model 521 Series Saws, Model 511 Series Saws, and other assorted models.

* cited by examiner

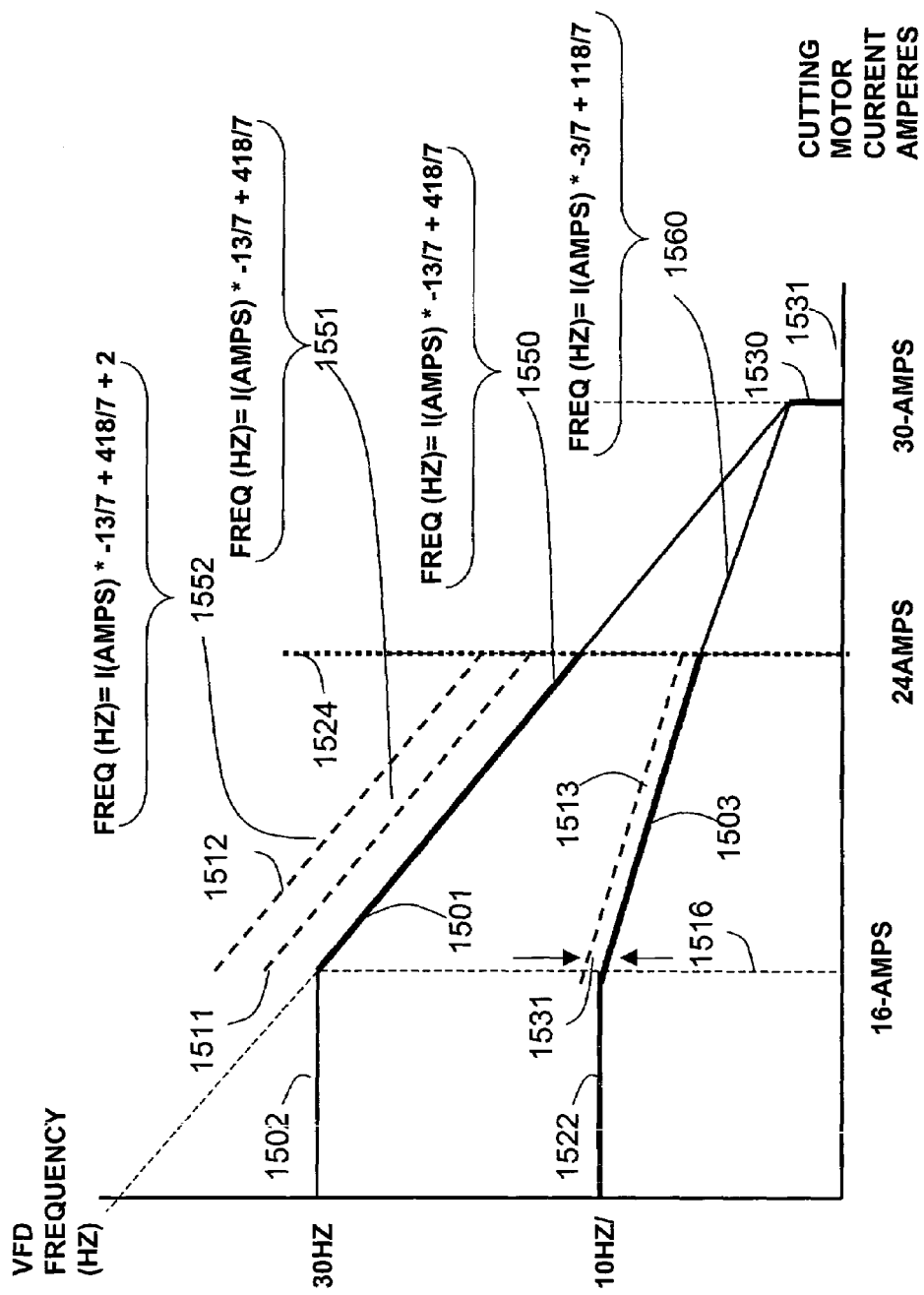
FIG.15 BELT/FEED SPEED VS MOTOR CURRENT

ROCK SAW

CROSS REFERENCE APPLICATIONS

This application is a non-provisional application claiming the benefits of provisional application No. 60/399,340 filed Jul. 29, 2002

FIELD OF INVENTION

The present invention relates to automatic rock saws. More particularly, the present invention is an automatic rock saw with a conveyer that is controlled such that the speed of the rock being conveyed to the blade to be cut is controlled according to the workload of the saw blade. The present invention also discloses a rock saw with a horizontal and vertical blade, so that corners can be cut in a rock in one pass.

BACKGROUND OF THE INVENTION

Saws that cut rock, brick and similar materials are well known in the art. Using a conveyor belt to carry the material to the blade is also well known in the art. One of the common problems with conveyor belt systems is that the conveyor carries the material to the blade at a given speed. With rock in particular, the material can have irregular shapes and varying degrees of hardness and/or thickness, resulting in a wide variation in the difficulty of cutting a given piece. It is well known in the art to control the pressure of the saw blade, so that the saw blade does not change speed as the blade encounters harder and softer substances, thereby increasing blade efficiencies and extending equipment/tooling life.

The problem presented by the prior art is that the conveyor belt continued to present the material at a given rate of speed, regardless of how hard the saw motor has to work. This increases the wear on the saw and can cause premature blade segment wear and even blade segment separation from the blade core, which is a distinct hazard. Furthermore, as the material being cut is forced upon a blade already working at maximum capacity, drive train components, and eventually the prime mover, may prematurely fail.

Another problem in rock saws is that there is a demand for "corner pieces" of facing rock to use for building faces. The corner pieces need to have an interior corner cut into the rock so that the rock can be placed on the corner of the building. At the present time these pieces need to be cut by hand using freestanding rock saws. This is time consuming, costly and can result in large amounts of spoilage while forcing the saw operator to work in close proximity to a rotating, exposed saw blade.

The present invention solves these problems by using a saw motor load sensor to control the speed of the conveyors bringing the rock to the saw blade. As the saw motor works harder to cut a given rock, the controller automatically slows the conveyor belts, reducing the load on the saw blade. If the saw blade is easily cutting a given rock and not working at optimum speed, the conveyors will be sped up, increasing production.

Also provided in an alternate embodiment is a horizontal blade that can be moved into place to cut the "bottom" of a corner piece, then the standard, vertical blade cuts the other side of the corner.

Common in all manual rock cutting operations is the need to produce a clean finished product. Manual sawing of stone produces fines, a gritty, slurry like material of rock dust and water. As the water dries from the finished product, a thin film of rock dust remains on the product changing the color of the slab. In manual operations, this slurry like material is often sprayed onto the saw operator becomes airborne as a mist. Without proper respirators this mist can expose the operator to silicosis. A water spray that both cleans the finished product and causes the mist to be directed away from the operators can be incorporated in all embodiments, potentially reducing the risk of silicosis.

SUMMARY OF THE INVENTION

The primary aspect of the present invention is to provide a rock saw that has variable speed conveyor belts which are controlled by the work load on the saw motors.

Another aspect of the present invention is to provide a rock saw that can automatically cut corner pieces.

Other aspects of this invention will appear from the following description and appended claims, reference being made to the accompanying drawings forming a part of this specification wherein like reference characters designate corresponding parts in the several views.

BRIEF DESCRIPTION OF THE DRAWINGS

FIG. 15 is a graph showing the relationship of saw motor current vs. conveyor speed for the embodiment of FIGS. 6e and 6f.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

The present invention can be used to cut rock, concrete, block, clay brick or any similar hard material. For simplicity, only the cutting of rock will be specifically mentioned, but it is understood that the cutting of all of the other materials is included within the scope of this invention.

Figure 1:
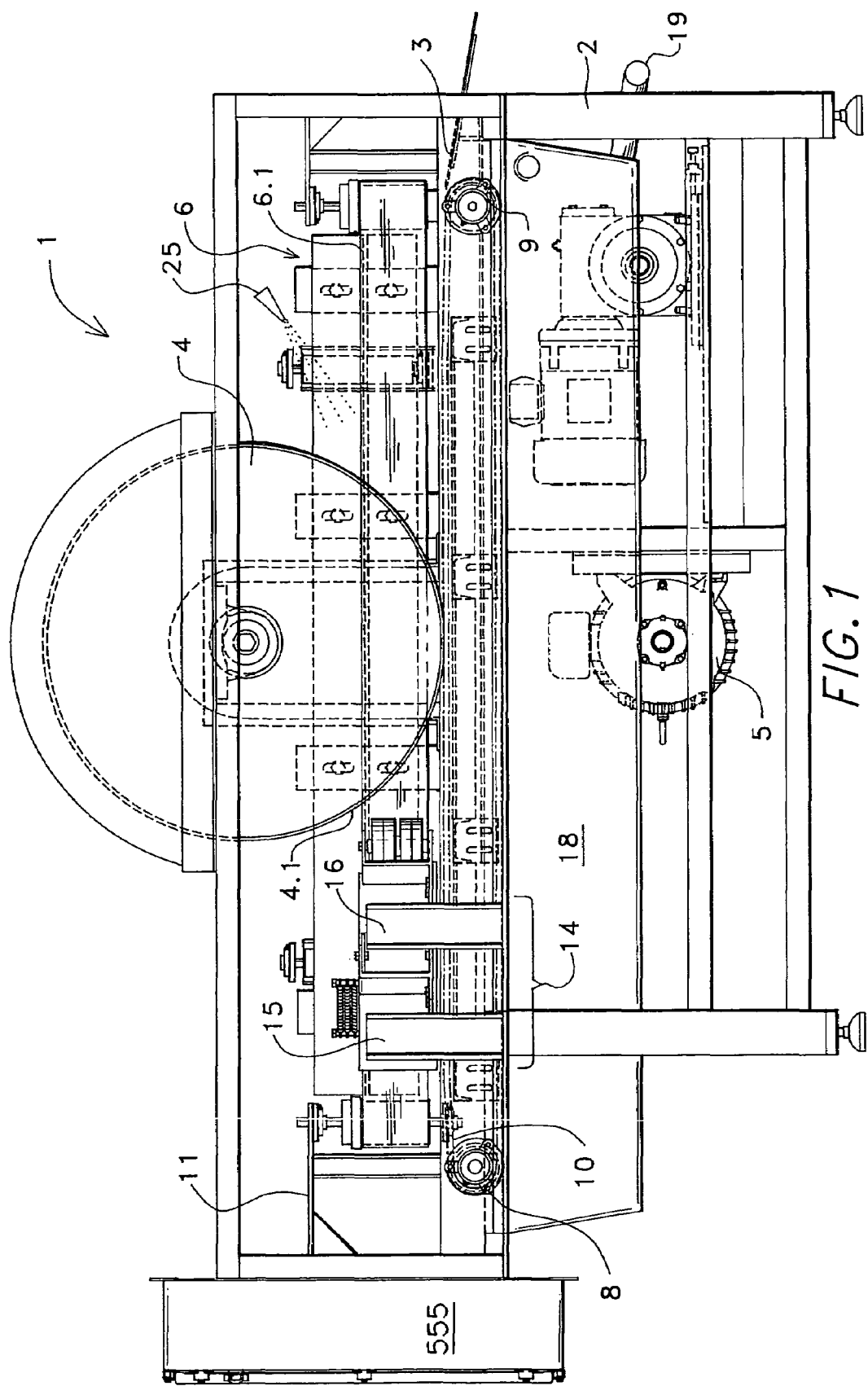
FIG. 1 is a front plan view of the present invention with the safety covers removed.
Figure 2:
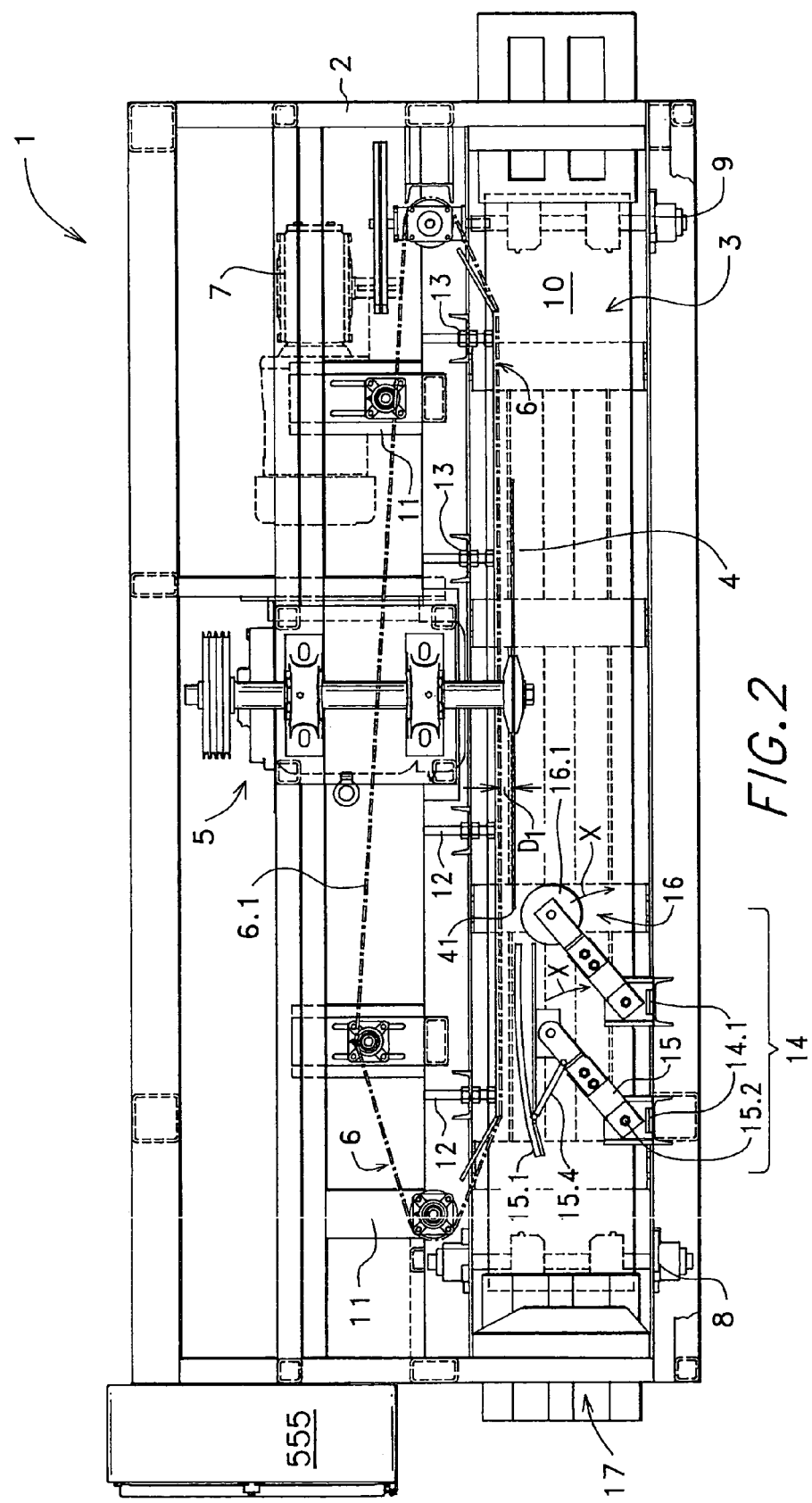
FIG. 2 is a top plan view of the present invention as shown in FIG. 1

Referring first to FIGS. 1 and 2, the rock saw 1 has a frame 2 and a vertical blade 4. The vertical blade 4 is driven by blade motor 5 that is connected to the vertical blade 4. This connection can be done in a variety of manners well known in the art. The rock saw 1 has a main conveyor 3 and a vertical conveyor 6, which are both driven by conveyor motor 7, again in a known manner. The main conveyor 3 has rollers 8,9 and a conveyor belt 10. The conveyor belt 10 is made of a durable material to hold the heavy rocks and so that any accidental contact of the vertical blade 4 with the conveyor belt 10 will not cut the conveyor belt 10. The main conveyor 3 can either be fixed in place or can be adapted (not shown) to move vertically in relation to the vertical blade 4. The embodiment shown in FIGS. 1, 2 and 3 allows for main conveyor 3 to be lifted by means of plastic shims (not shown) along the entire length of the work surface. This allows for blade wear, maximizing blade segment usage.

Figure 3:
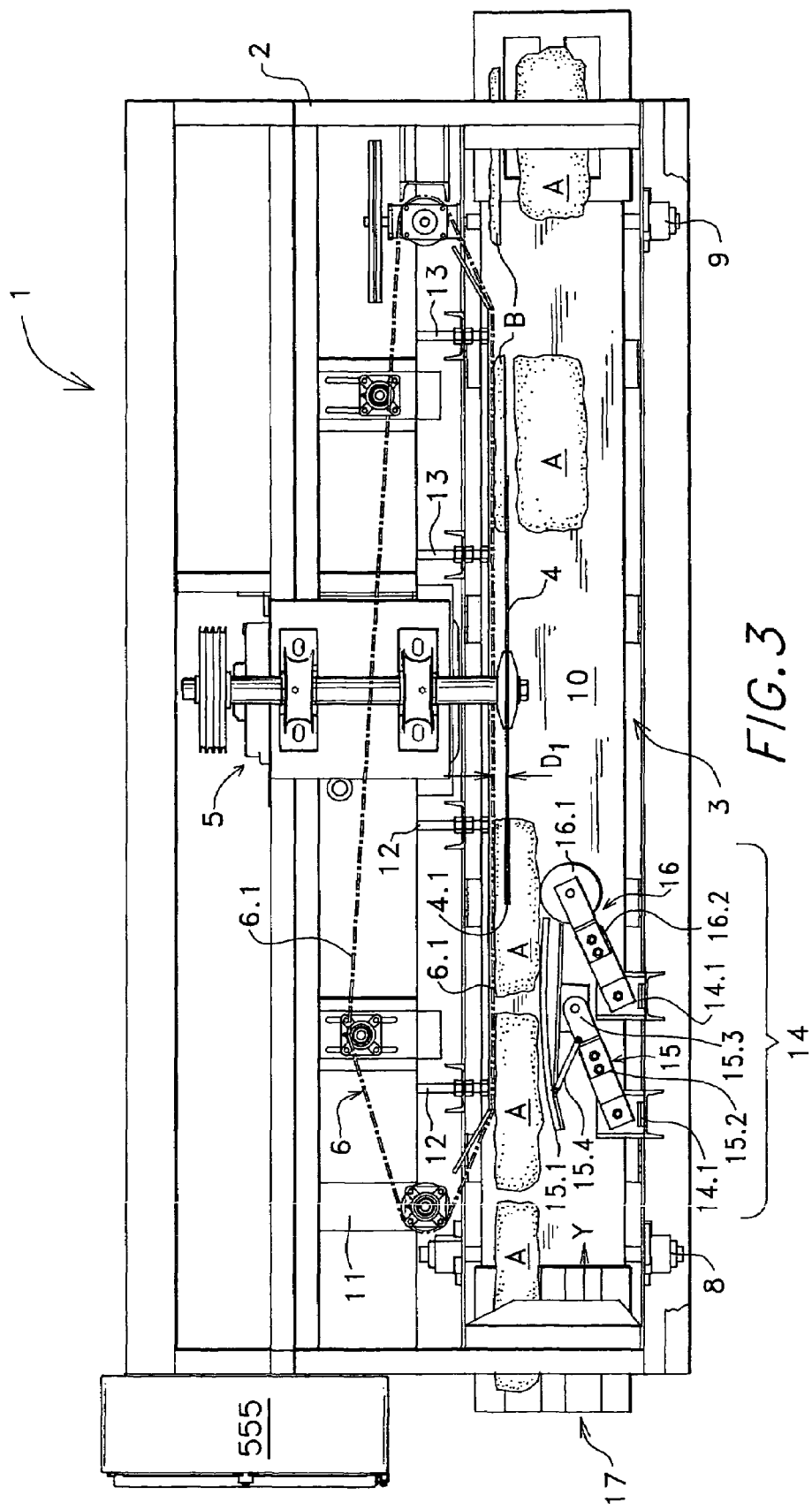
FIG. 3 is a top view of rock being cut in the present invention.

The vertical conveyor 6 is located behind the vertical blade 4 and is spaced a given distance D1 from the vertical blade 4. D1 will be the thickness of the rock slice B that is cut by the rock saw, as shown in FIG. 3. The vertical conveyor 6 is mounted on frame 11, which is attached to frame 2. The vertical conveyor 6 can be moved closer to or away from the vertical blade 4 at adjustment points 12, 13 as shown in FIGS. 2 and 3. This allows the vertical conveyor 6 to be moved towards or away from vertical blade 4, changing D1 and the thickness of the rock slice B. In the preferred embodiment the range of D1 is up to 3½ inches. The adjustment points 12, 13 are threaded screws (not shown) to allow the vertical conveyor belt 6.1 to be infinitely adjusted with the range of movement. However, other known adjustment mechanisms could be used instead.

As shown in FIGS. 2 and 3, a holding mechanism 14 is provided to hold the rock A against the vertical conveyor 6 until the rock A is engaged with the vertical blade 4, as shown in FIG. 3. The holding mechanism 14 consists of one or more spring loaded holding arms. The holding arms move in the direction of arrows X as the rock A moves along the conveyors. The holding arms can take a variety of forms depending on the material to be cut. In the disclosed embodiment there is a rocking panel arm 15 and a roller arm 16. The rocking panel arm 15 has a slightly curved holding panel 15.1, which is pivotally attached to the main arm 15.2 at pivot 15.3. The holding panel 15.1 is biased towards a parallel alignment with the vertical conveyor 6 with spring arm 15.4. The roller arm 16 has a roller 16.1 rotatably mounted on main arm 16.2.

Both the rocking panel arm 15 and the roller arm 16 are pivotally attached to the frame 2 and are sprung towards the vertical conveyor 6 with springs (Not shown) in boxes 14.1.

Figure 4:
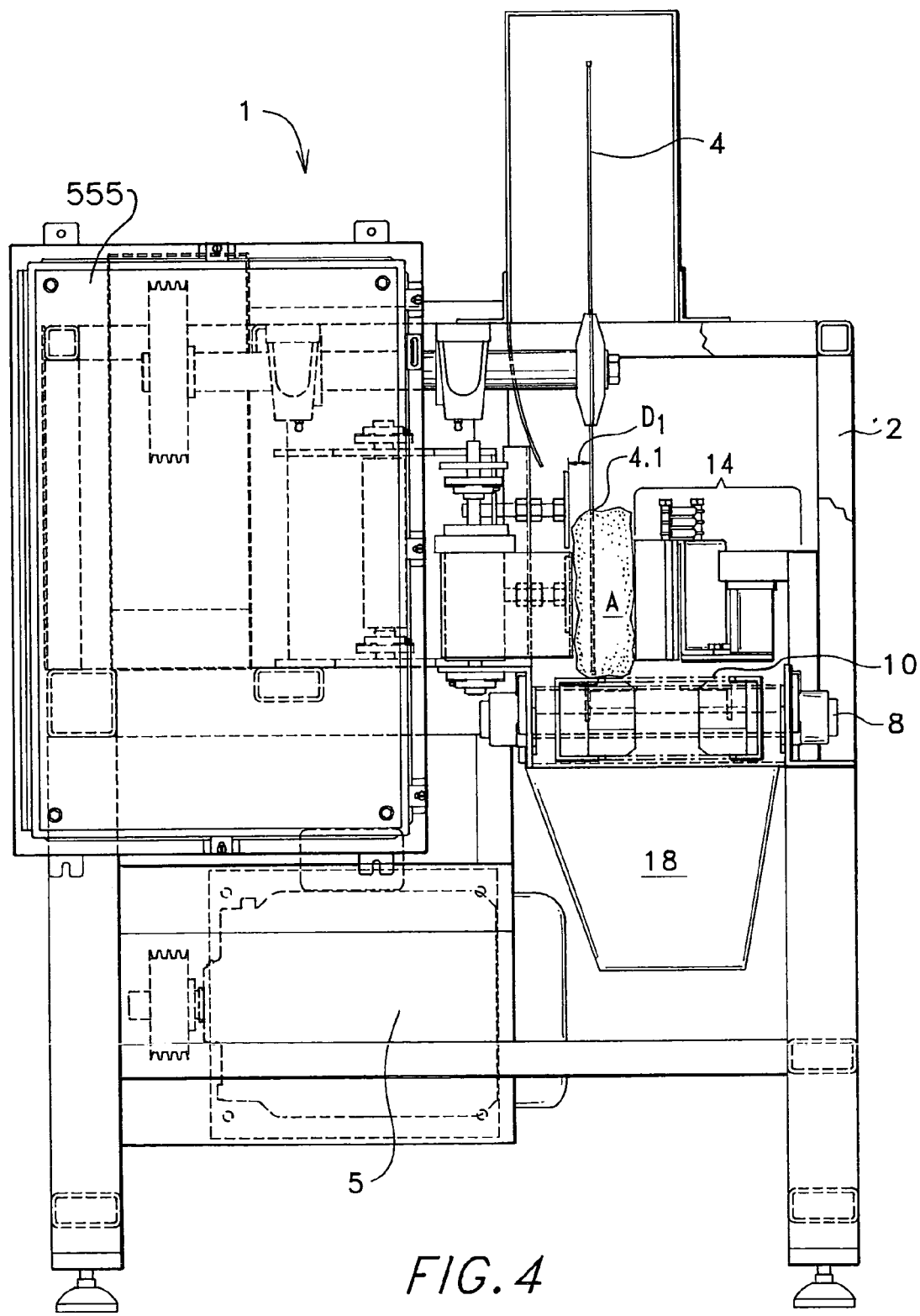
FIG. 4 is a side plan view of a rock being cut in the present invention.

As best shown in FIGS. 3 and 4, in operation rocks A, or other material to be cut, are loaded on front end 17 of the main conveyor 3. The conveyor 3 carries the rocks A toward the vertical blade 4, as shown by arrow Y. The rocks A move along conveyor 3 and are carried up against holding mechanism 14. Holding mechanism 14 presses the rock A against vertical conveyor belt 6.1, which travels at the same speed as the main conveyor 3. Rock A is then carried up to leading edge 4.1 of vertical saw 4. Depending on the hardness of the rock A, the speed of the conveyors 3 and 6 maybe varied as described below to allow for maximum efficiency of rock cutting. Once the rock A has been cut slab B with a thickness of D1 is created. Rock A can either be re-cut for more slabs or disposed of, depending on the application.

Blade 4 is water-cooled and cleaned with jets with water in a known manner and is therefore not shown. The water drains into trough 18 and is drained from there by drain 19. In addition, final jets 25, shown in FIG. 1, of water are used to clean the cut slab B of cutting debris and to reduce the amount of rock dust that is put into the air. The plumbing of the jets 25 is well known and therefore not shown. This eliminates a final cleaning step necessary in manual operations. The reduction of the amount of dust put into the local atmosphere may also reduce the health risk to the operators of the machinery by possibly reducing the risk of silicosis.

Figure 7:
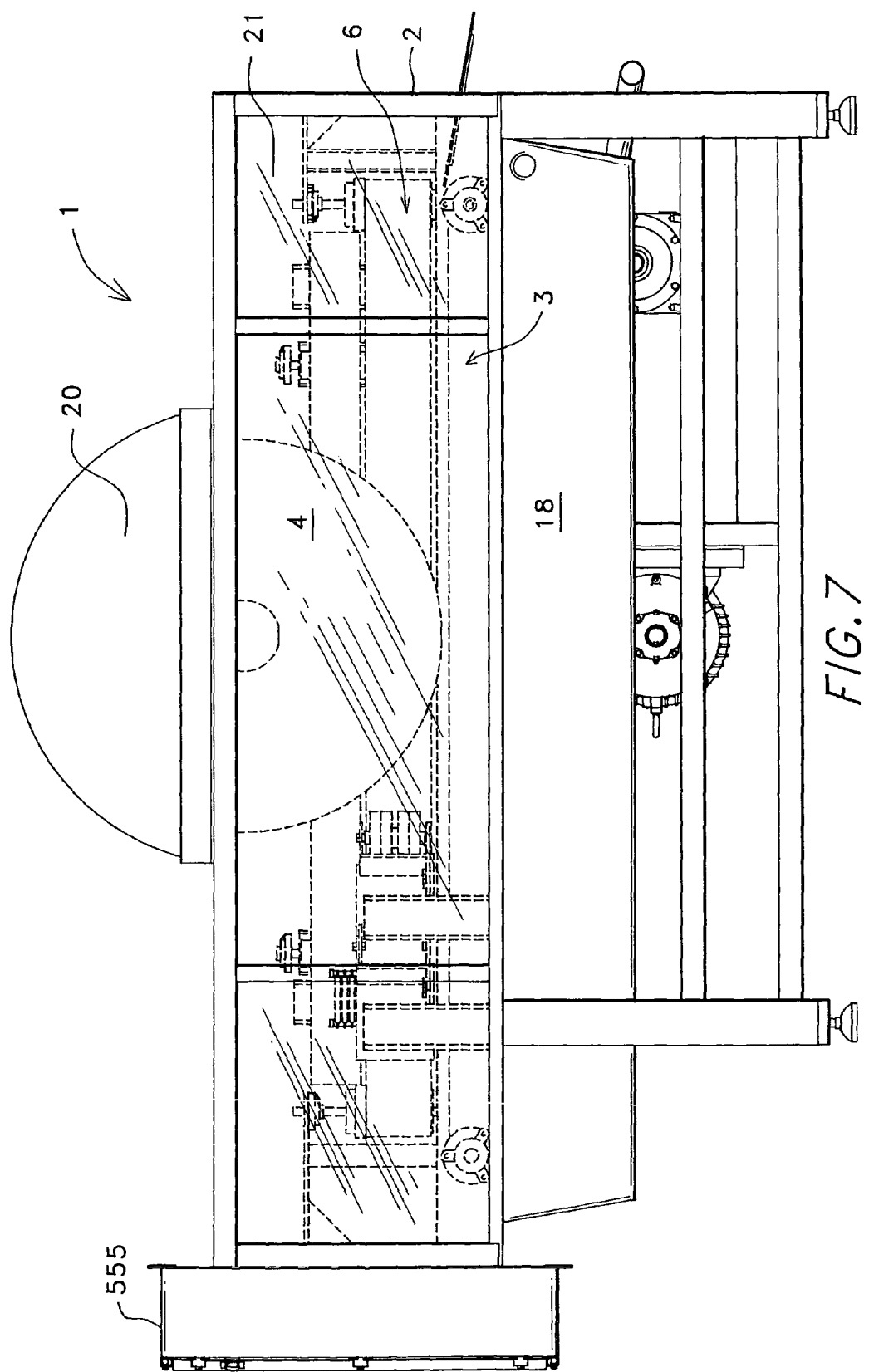
FIG. 7 is a front plan view of the present invention with the safety covers in place.

FIG. 7 shows the rock saw 1 with a complete set of safety covers 20, 21. Although the safety covers 20, 21 are not necessary for the operation of the invention, they are advantageous to the safe operation of the machine and may be required by work place safety rules. In addition, in combination with the water jets and the safety cover may reduce the amount of dust released into the atmosphere by the operation of the rock saw 1 and thereby possibly reduce the risk of silicosis in operators.

Figure 8:
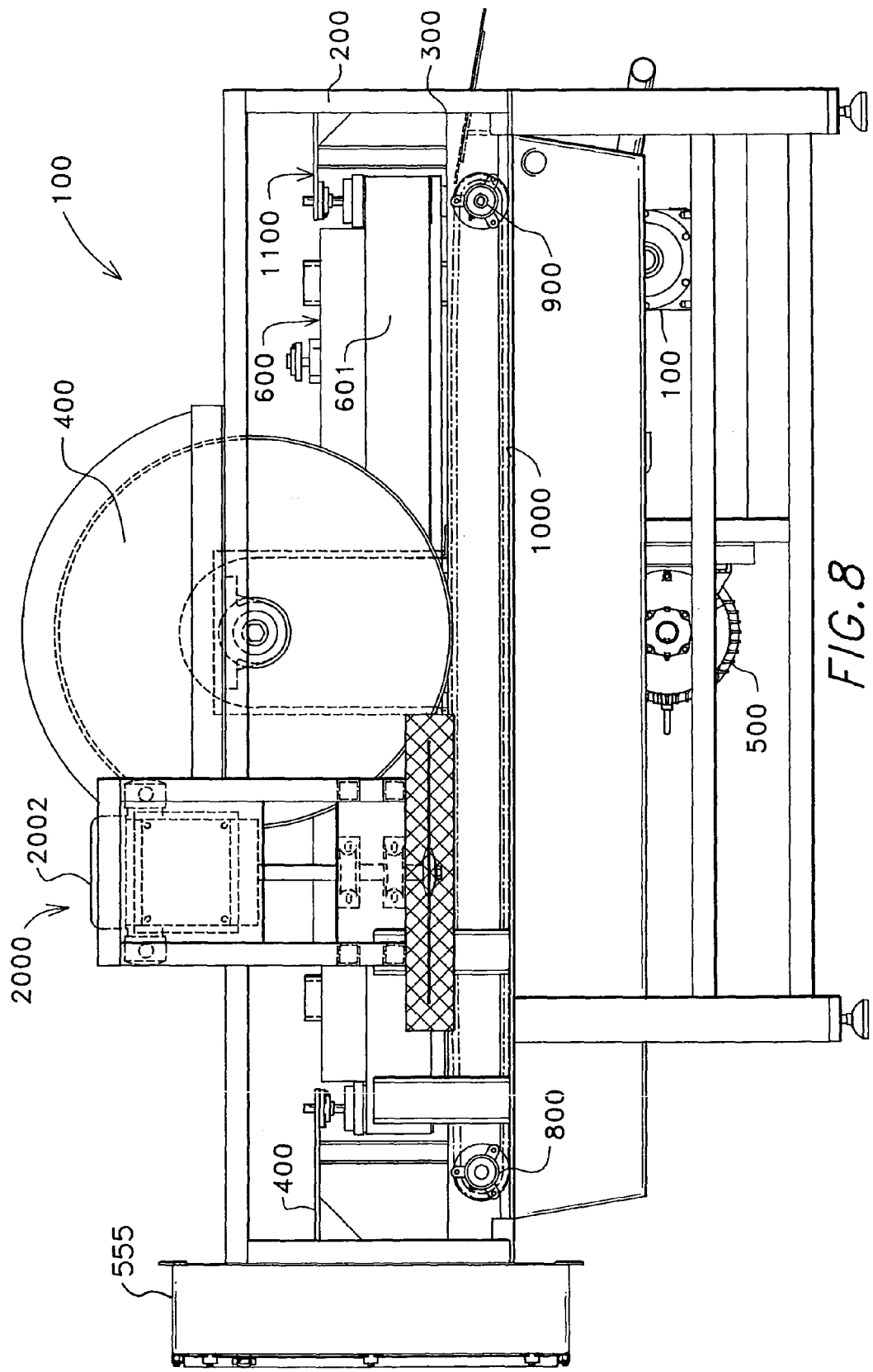
FIG. 8 is a front plan view of an alternate embodiment of the present invention with a horizontal blade.
Figure 9:
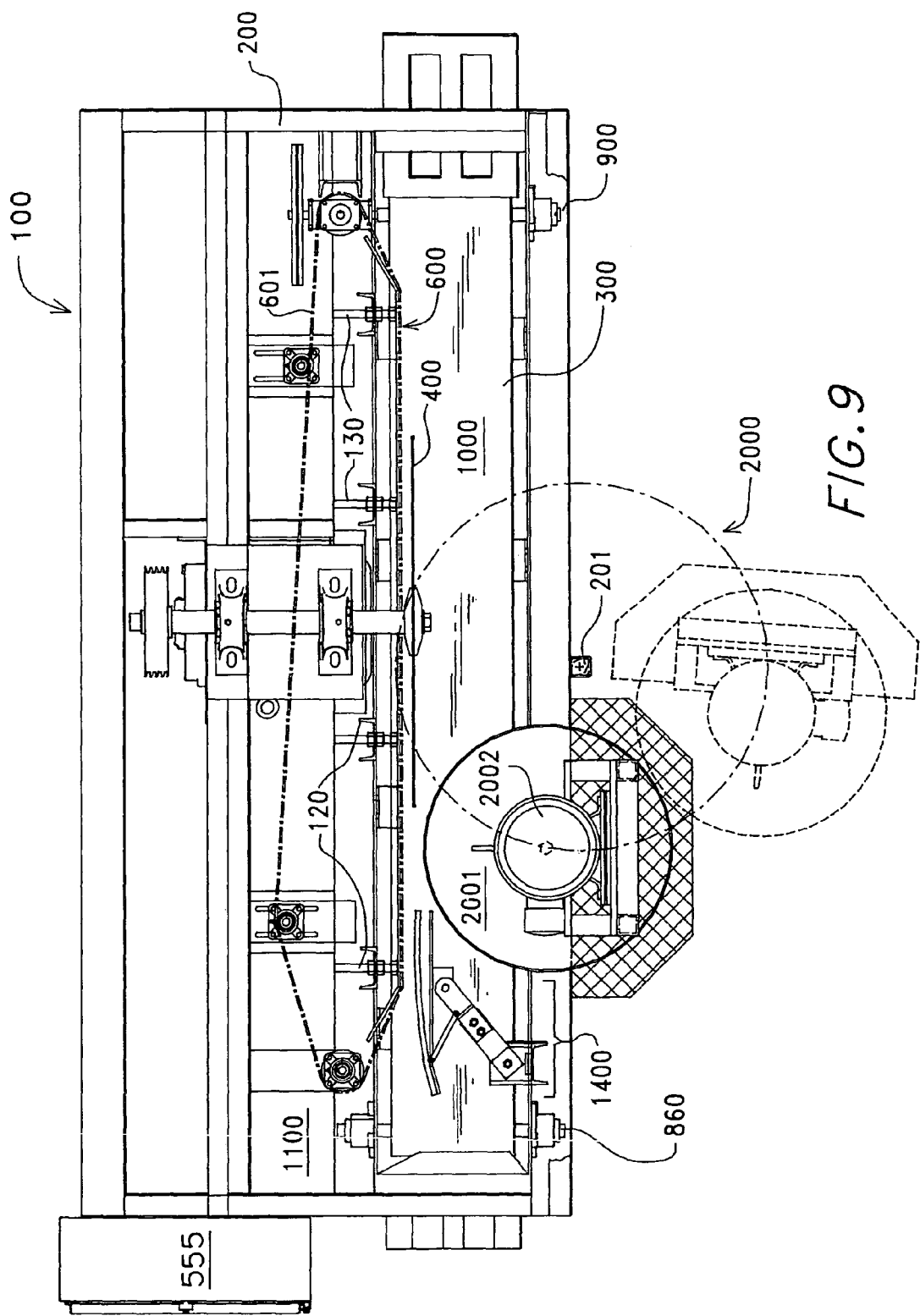
FIG. 9 is a top plan view of the alternate embodiment as shown in FIG. 8.
Figure 10:
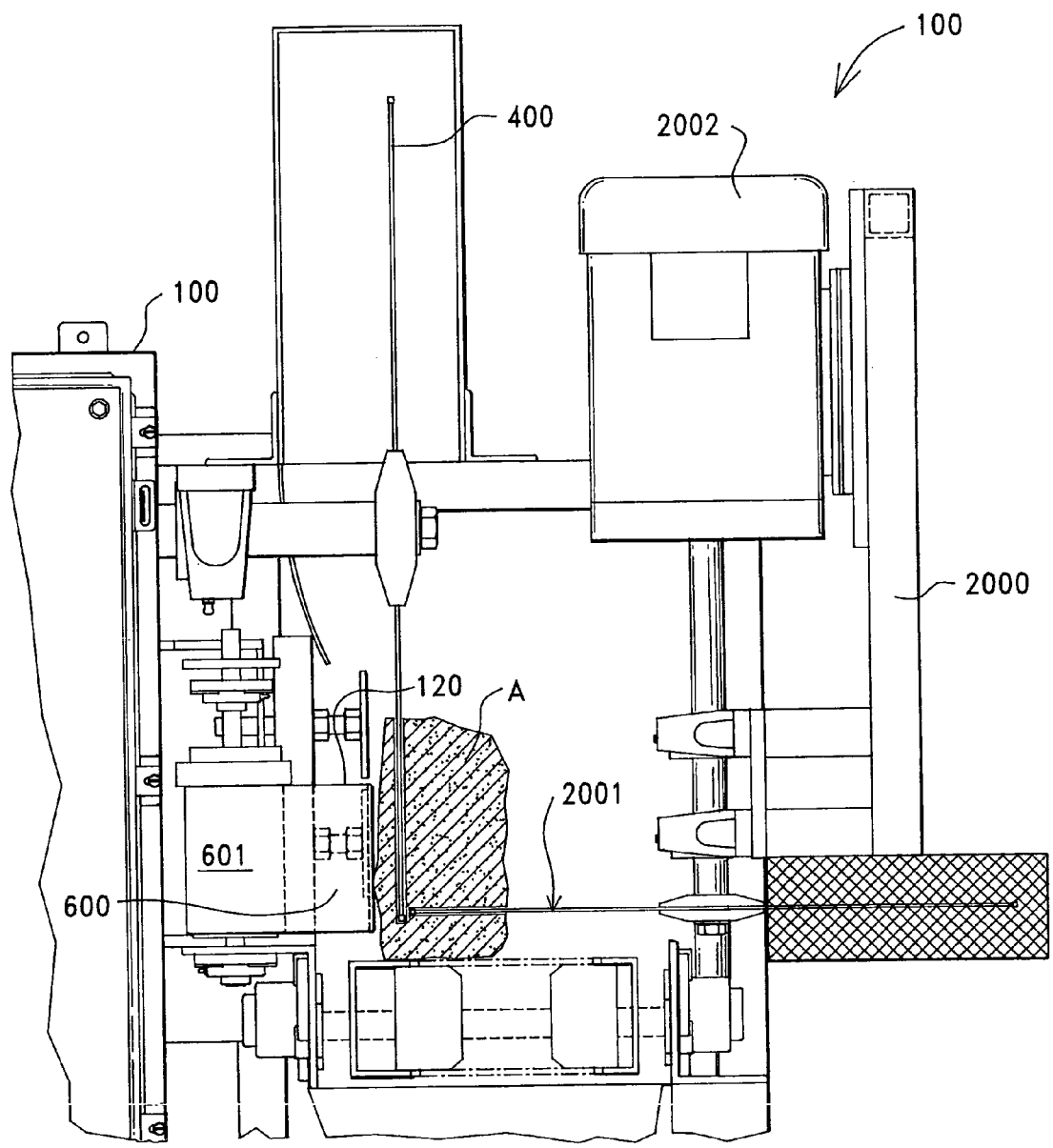
FIG. 10 is a side plan view of a corner piece being cut in the alternate embodiment shown in FIG. 8.

An alternate embodiment of the present invention is shown in FIGS 8, 9 and 10. A rock saw 100 has a frame 200, a vertical blade 400. The vertical blade 400 is driven by vertical blade motor 500 which is connected to the vertical blade 4 in a manner well known in the art.

The rock saw 100 has a main conveyor 300 and a vertical conveyor 600, which are both driven by conveyor motor 700, again in a known manner.

The main conveyor 300 has rollers 800,900 and a conveyor belt 1000. The conveyor belt 1000 is made of a durable material to hold the heavy rocks and so that any accidental contact of the vertical blade 400 not cut the conveyor belt 1000. The main conveyor 300 can either be fixed in place or can be adapted (not shown) to move vertically in relation to the vertical blade 400. Conveyor 300 can be moved in the vertical positions relative to blade 400 at the same time by incorporating a series of interconnected jackscrews mounted on frame 200 or other known adjustable mechanisms. The adjustable mechanism must be capable of being exactly adjusted to a given location and the adjustment mechanism must be able to withstand the vibrations of the operation of the saw 100 without moving.

The vertical conveyor 600 is located behind the vertical blade 400 and is spaced a given distance D1 from the vertical blade 400. D1 will be the thickness of the rock slice C that is cut by the rock saw. The vertical conveyor 600 is mounted on frame 1100. The vertical conveyor 6 can be moved closer to or away from the vertical blade 4 at adjustment points 120, 130 as shown in FIGS. 9 and 10. This allows the vertical conveyor 600 to be moved towards or away from vertical blade 400, changing D1 and the thickness of the rock slice B. In the preferred embodiment the range of D1 is up to 3½ inches. The adjustment points 120, 130 are threaded screws (not shown) to allow the vertical conveyor belt 601 to be infinitely adjusted with the range of movement. However, other known adjustment mechanisms could be used instead.

As shown in FIG. 9, a holding mechanism 1400 is provided to hold the rock A against the vertical conveyor 600 until the rock A is engaged with the vertical blade 400, as shown in FIG. 9. The holding mechanism 1400 is basically the same mechanism as holding mechanism 14 described above. The holding arms need to be placed such that they do not interfere with horizontal blade mechanism 2000. The horizontal blade mechanism 2000 has a horizontal blade 2001 which is substantially parallel to main conveyor 300 and substantially perpendicular to vertical blade 400 as shown in FIG. 10.

The horizontal blade mechanism 2000 in the preferred embodiment is pivotally mounted to frame 200 at point 201 via mounting arm (not shown). The horizontal blade 2001 is powered by horizontal blade motor 2002 and connected to the blade 2001 in a known manner. In operation to cut a corner piece both blades 400 and 2001 will be in operation simultaneously as shown in FIG. 10. The need for the holding arms is lessened in the operation of corner cutting since the horizontal blade 2001 will help hold the rock A against the vertical blade 400, therefore one of the holding arms may be removed for corner cutting operations.

Figure 12:
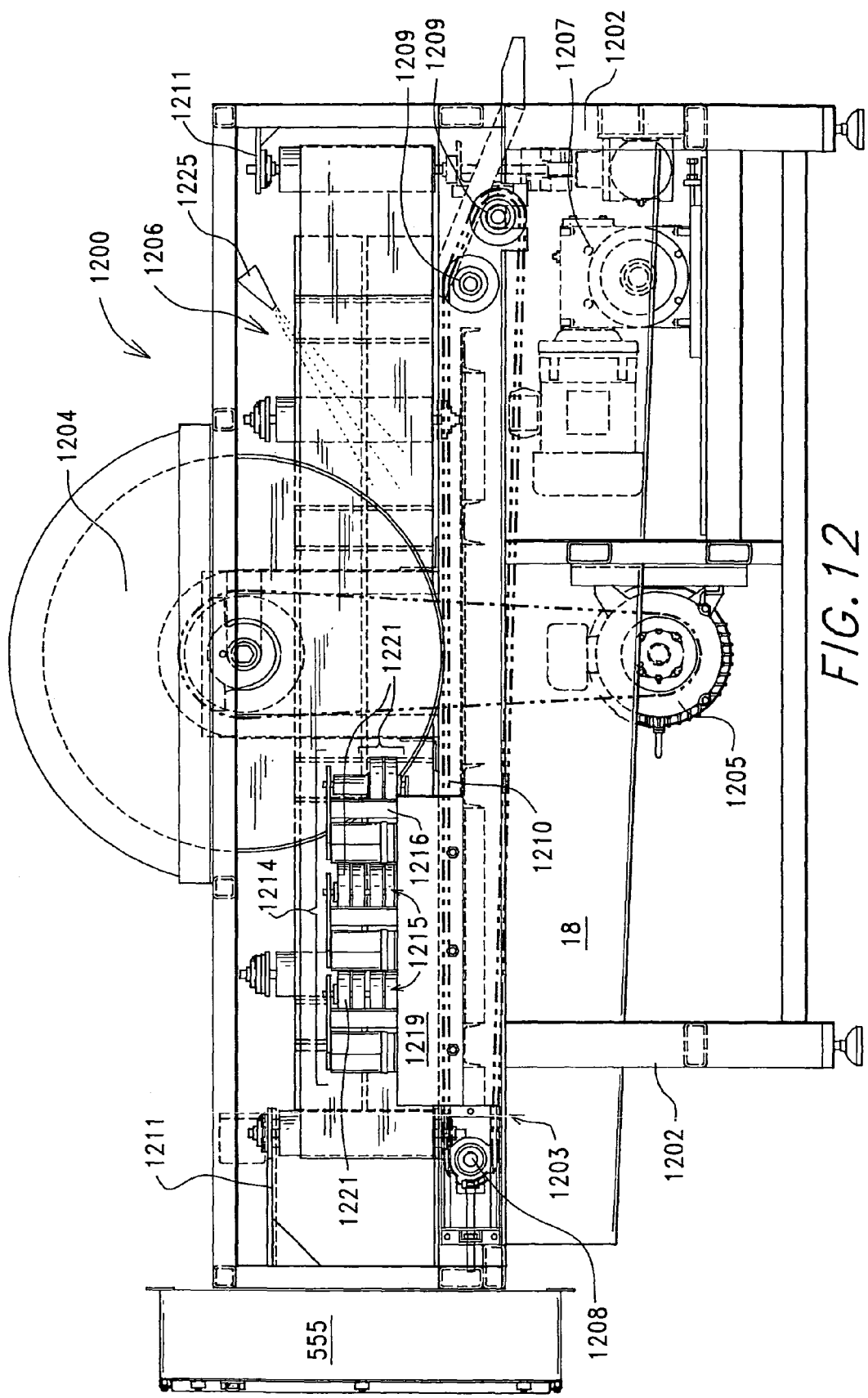
FIG. 12 is a front plan view of an alternate embodiment of the present invention.
Figure 13:
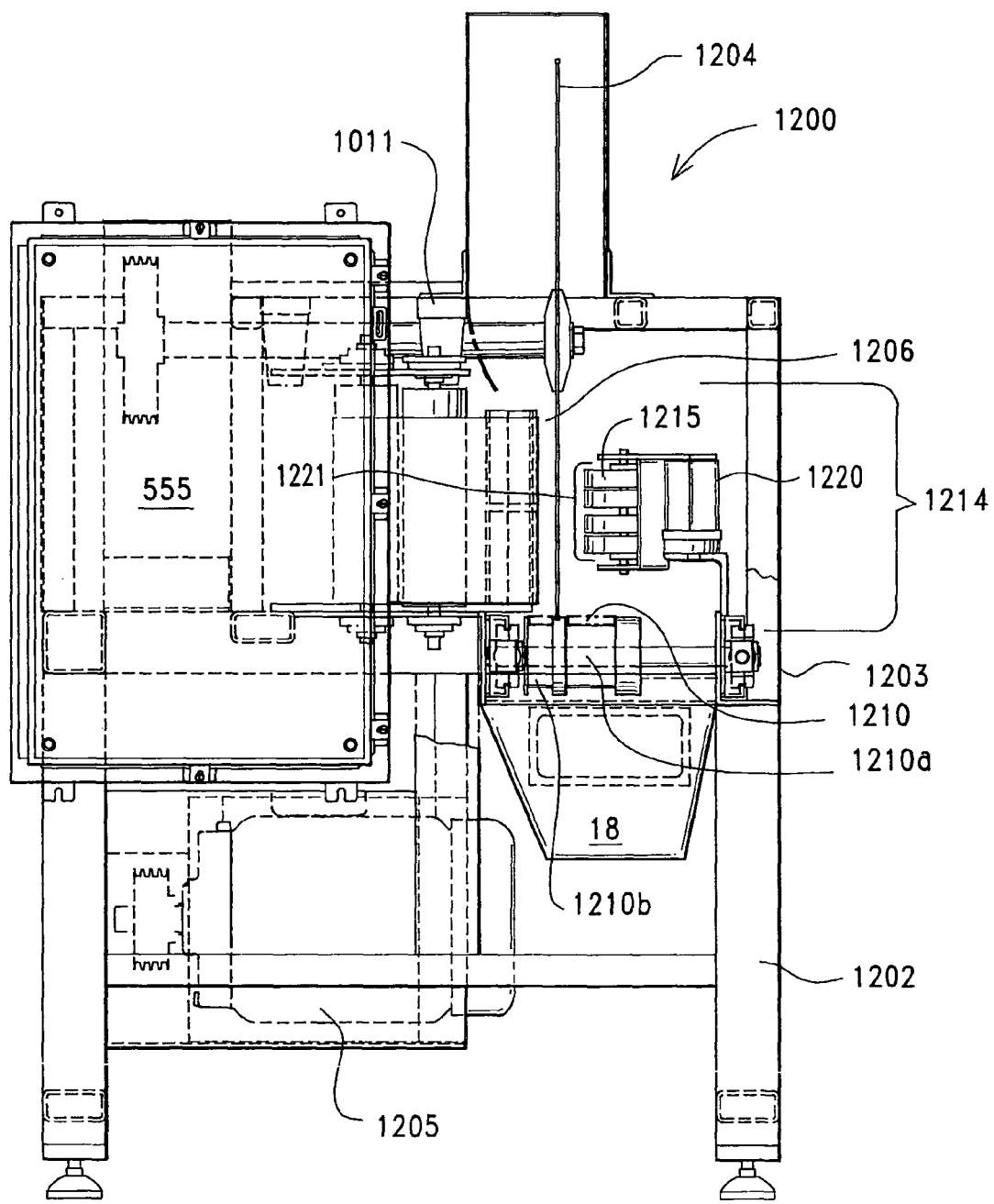
FIG. 13 is a side plan view of FIG. 12.
Figure 14:
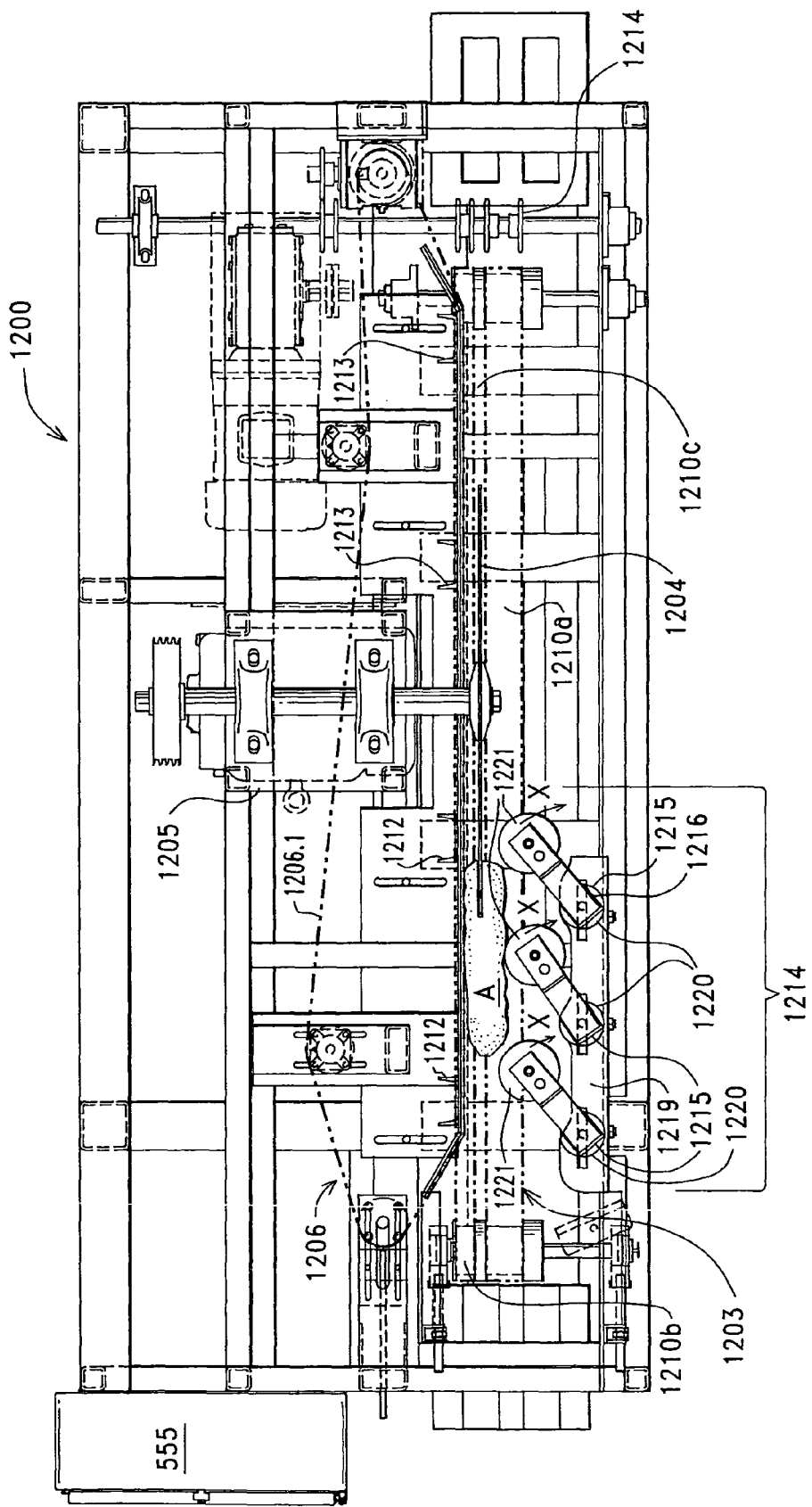
FIG. 14 is a top plan view of FIG. 12.

An additional alternate embodiment is shown in FIGS. 12, 13 and 14, the rock saw 1200 has a frame 1202, and a vertical blade 1204. The vertical blade 1024 is driven by blade motor 1205 that is connected to the vertical blade 1204. This connection can be done in a variety of manners well known in the art. The rock saw 1200 has a main conveyor 1203 and a vertical conveyor 1206, which are both driven by conveyor motor 1207, again in a known manner. The main conveyor 1203 has rollers 1208, 1209 and 1209a and a conveyor belt 1210. The offset rollers 1209 and 1209a help prevent slack in the conveyor belt 1210 when the direction of operation of the belt 1210 is reversed.

The conveyor belt 1210 is formed of durable material to hold the heavy rocks and is divided into two pieces 1210a and 1210b, as best seen in FIG. 14. Section 1210a is on the outside of the vertical blade 1204 and section 1210b is between the vertical blade 1204 and the vertical conveyor 1206. There is a gap 1210c between the two sections 1210a and 1210b. As shown in FIG. 13 the vertical blade 1204 can extend down into the gap 1210c. This prevents the vertical blade from cutting the main conveyor belt during operations. This also allows for blade wear without having to adjust the position of the main conveyor 1203. A new vertical blade 1204 can be set so that it extends well into gap 1210c. Even after substantial blade wear has occurred, the blade 1204 will still cut all the way through the rock A. This sectional arrangement of conveyor 1206 also reduces blade wear, as the blade 1204 no longer comes into contact with conveyor belt 1210.

If desired, the gap 1210c can be covered with metal plates on those areas in front of and after the blade 1210 to reduce the risk of debris falling between the sections 1210a and 1210b. The two sections are driven by cam 1218, shown in FIG. 16.

The vertical conveyor 1206 is located behind the vertical blade 1204 and is spaced a given distance D1 from the vertical blade 1204. D1 will be the thickness of the rock slice B that is cut by the rock saw, as shown in FIG. 14. The vertical conveyor 1206 is mounted on frame 1211, which is attached to frame 1202. The vertical conveyor 1206 can be moved closer to or away from the vertical blade 1204 at adjustment points 1212, 1213 as shown in FIG. 14. This allows the vertical conveyor 1206 to be moved towards or away from vertical blade 1204, changing D1 and the thickness of the rock slice B. In the preferred embodiment the range of D1 is up to 3½ inches. The adjustment points 1212, 1213 are threaded screws (not shown) to allow the vertical conveyor belt 1206.1 to be infinitely adjusted with the range of movement. However, other known adjustment mechanisms could be used instead.

As shown in FIGS. 12, 13, and 14, a holding mechanism 1214 is provided to hold the rock A against the vertical conveyor 1206 until the rock A is engaged with the vertical blade 1204, as described above. The holding mechanism 1214 consists of one or more spring loaded holding arms. The holding arms move in the direction of arrows X in FIG. 14 as the rock A moves along the conveyors. In the embodiment shown in FIGS. 12, 13 and 14 there are two full sized arms 1215 and a short arm 1216. All three arms are pivotally mounted base 1220 which are attached to frame 1219. The arms 1215 and 1216 are spring biased toward the vertical conveyor to hold the rock A against the vertical conveyor 1206.

The roller arms 1215 and 1216 have rollers 1221 rotatably mounted on arms 1215 and 1216. Arms 1215 have four rollers each. Arm 1216 only has rollers 1221 on the bottom side, as best shown in FIG. 12. This allows arm 1216 to be placed closer to the vertical blade 1204, under the curve of the blade 1204. This helps prevent the rock A from being deflected outward by the blade 1204 and provides for a more even cut.

Blade 1204 is water-cooled and cleaned with jets with water in a known manner and is therefore not shown. The water drains into trough 18 and is drained from there. In addition, final jets 1225, shown in FIG. 12, of water are used to clean the cut slab B of cutting debris and to reduce the amount of rock dust that is put into the air. The plumbing of jets 1225 is well known in the art, and therefore not shown. This eliminates a final cleaning step necessary in manual operations. The reduction of the amount of dust put into the local atmosphere may also reduce the health risk to the operators of the machinery by possibly reducing the risk of silicosis.

Figure 5:
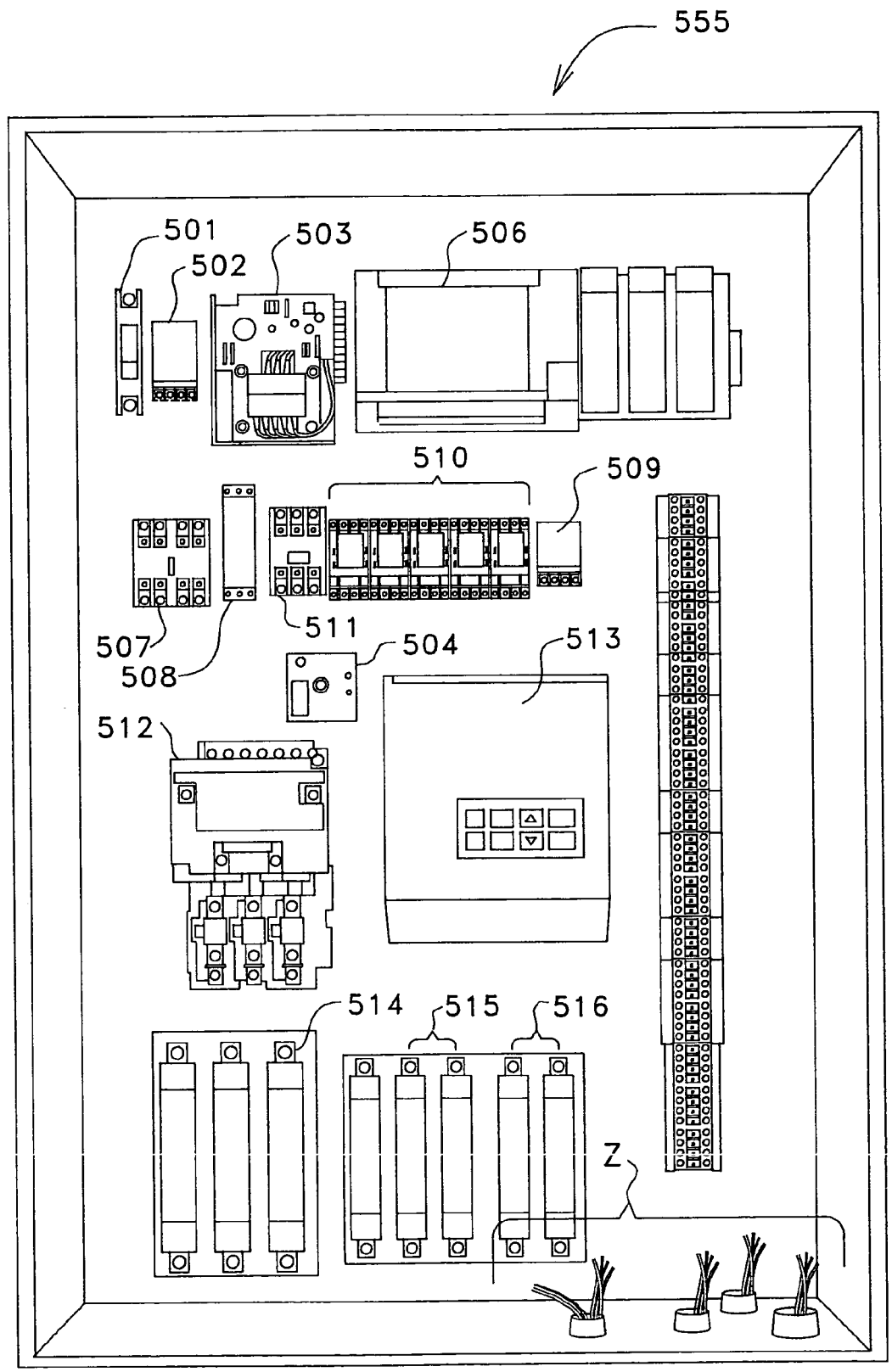
FIG. 5 is a plan view of the control box of the present invention.

As mentioned above the speed of the conveyors in all embodiments is controlled automatically by the load on the saw motor 5, 500 and 1205. The flowcharts 600a of FIGS. 6a–6b, 600b of FIGS. 6b–6d, and 600c of FIGS. 6e and 6f show different embodiments control logic of the present invention. The present invention can have provision for both manual operations and automatic operations. The electronics inside the control box 555 are shown in FIG. 5. For clarity, all of the wiring connecting the various components has been omitted.

The wiring is connected to wires Z, which connect the control box to the relevant parts of the present invention. It is to be understood that the specific electronics disclosed were selected for the power of the present embodiment and are discussed for illustration only. No limitation should be inferred. If a larger or smaller saw were needed then different components may well be required. The layout of the control box 555 disclosed is for illustration only and no limitation should be inferred. There are many potential ways to layout the components of the control box 555 depending on the particular application. Various considerations could affect the layout of the control box 555, including, but not limited to, space, options available to operators vs. supervisors, cost of components, cultural layout preferences and other known human factor considerations.

As shown in FIG. 5, the control box 555 has a main circuit breaker and a fuse 501 for the programmable logic controller (PLC). In the disclosed embodiment a 20 amp circuit breaker and a 3 amp fuse respectively are used. The selection of circuit breakers and fuses depend the power of the machinery to be run and are well know in the art. Next to the fuse 501 is the saw control relay 502, which is next to the power supply 503 for the saw motor load sensor 504. A 24 volt DC power supply is used in the current embodiment.

The micro PLC 506 has 120 VAC output card and an analog input and output cards. The master control relay 507 is provided for all control power in the present invention.

The safety cover 21 can be locked closed by an electromagnetic locking switch that is controlled by a power supply 508, and a lock release solenoid control relay 509. If the machine senses that the blade or blades are moving, it will not allow the lock to be opened. Only once the blades are no longer moving can the safety covers be opened. In addition, if the safety covers are not closed, the machine will not start the saw motors, as shown in box 607 of FIGS. 6*a* and 6*c* and box 603 of FIG. 6*e* in the automatic mode.

The variable frequency drive (VFD) 513 is controlled by control relays 510, including a start forward control, a selector control relay, a manual feed select control relay, a run enable control relay and a jog reverse select control relay. The water solenoid can be controlled by control relay 511. The saw motor is started with starter 512, which has an overload relay to sense if the saw motor is overloaded as shown by line 608 in FIGS. 6*a*, 6*b* 6*c*, 6*d* and 6*f*. If the motor is overloaded, the motor will be shut down or not allowed to start. This is sensed by the saw motor load sensor 504, which also controls the speed of the conveyors through the variable speed drive 513.

The saw motor 5, 500 and 1205, the variable frequency drive 513 and the control power transformer (not shown) are provided with separate fuses, 514, 515, and 516 respectively.

Figure 11:
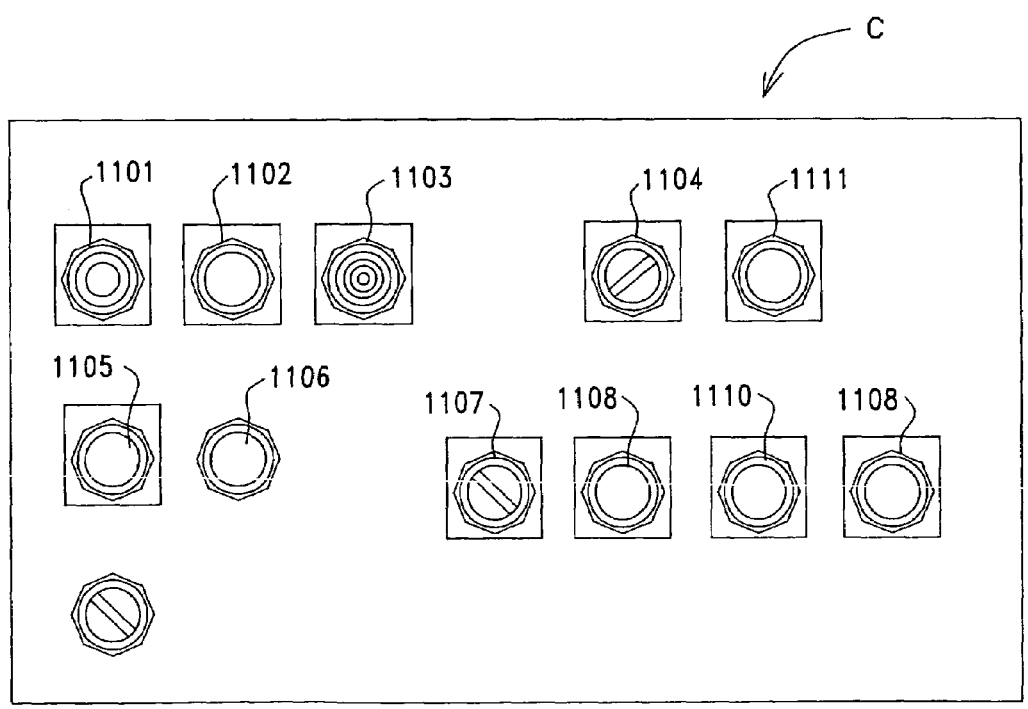
FIG. 11 is a front plan view of a control panel of the present invention.

One possible control panel C is shown in FIG. 11. The saw 1 has an emergency stop button 1101, indicated by box 606 FIGS. 6*a*, 6*c* and 6*e* on flowchart 600*a*, 600*b* and 600*c*. If this button is depressed, then all operations are halted and cannot be re-started until the button is reset. The power on button 1102 powers the machine and depressing this button 1102 starts the process of operating the present invention, as shown by box 602 FIGS. 6*a*, 6*c* and 6*e*. If the power is on light 1103 is lit, indicating the operation condition. The saw can have two modes of operation, an automatic mode and a manual mode. The mode is selected by setting the selector switch 1104 to either manual box 609 or automatic setting box 610 in all flowcharts 600.

Figure 6A:
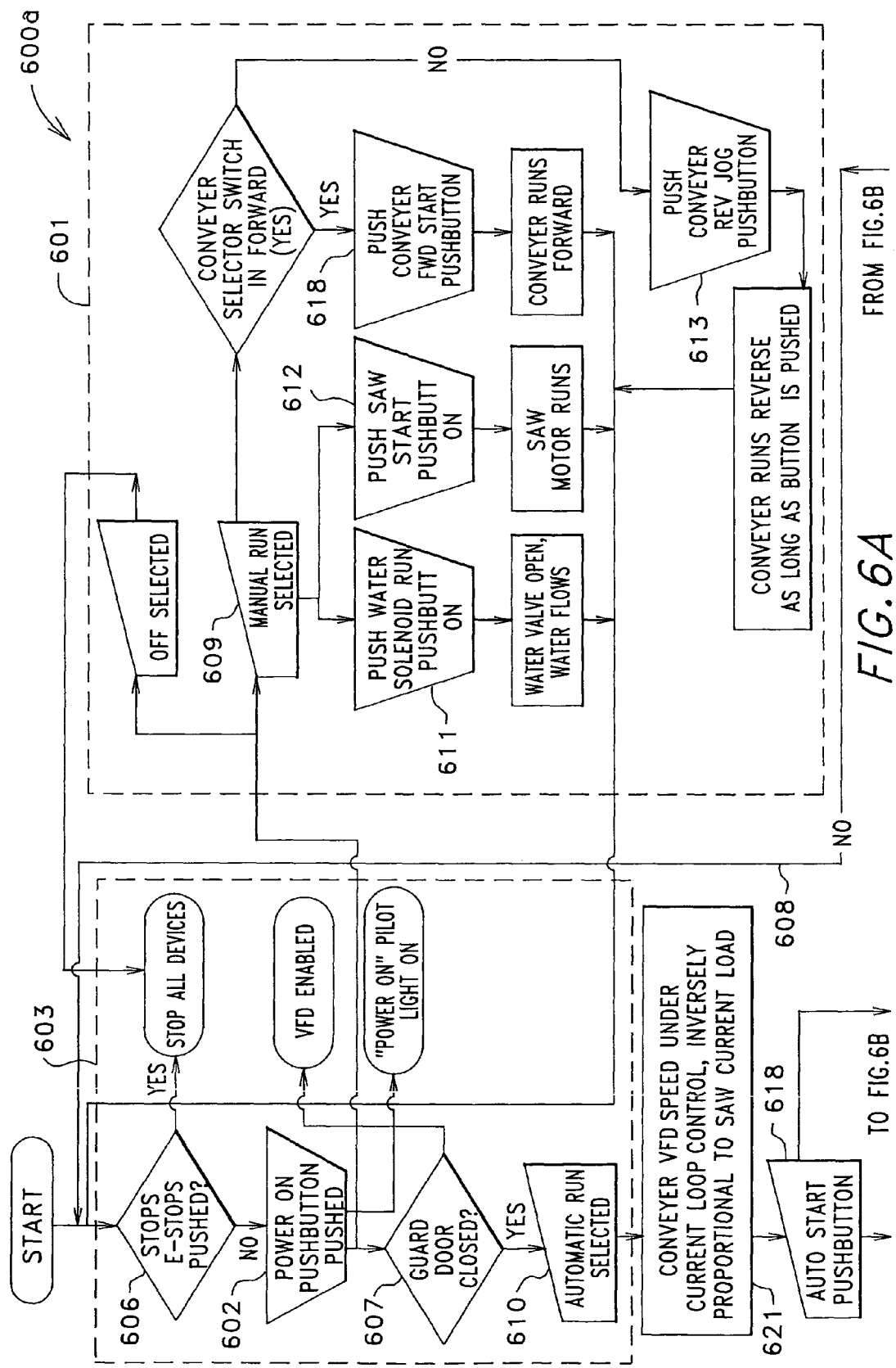
FIGS. 6a and 6b are a flowchart showing one possible control logic of the present invention.
Figure 6B:
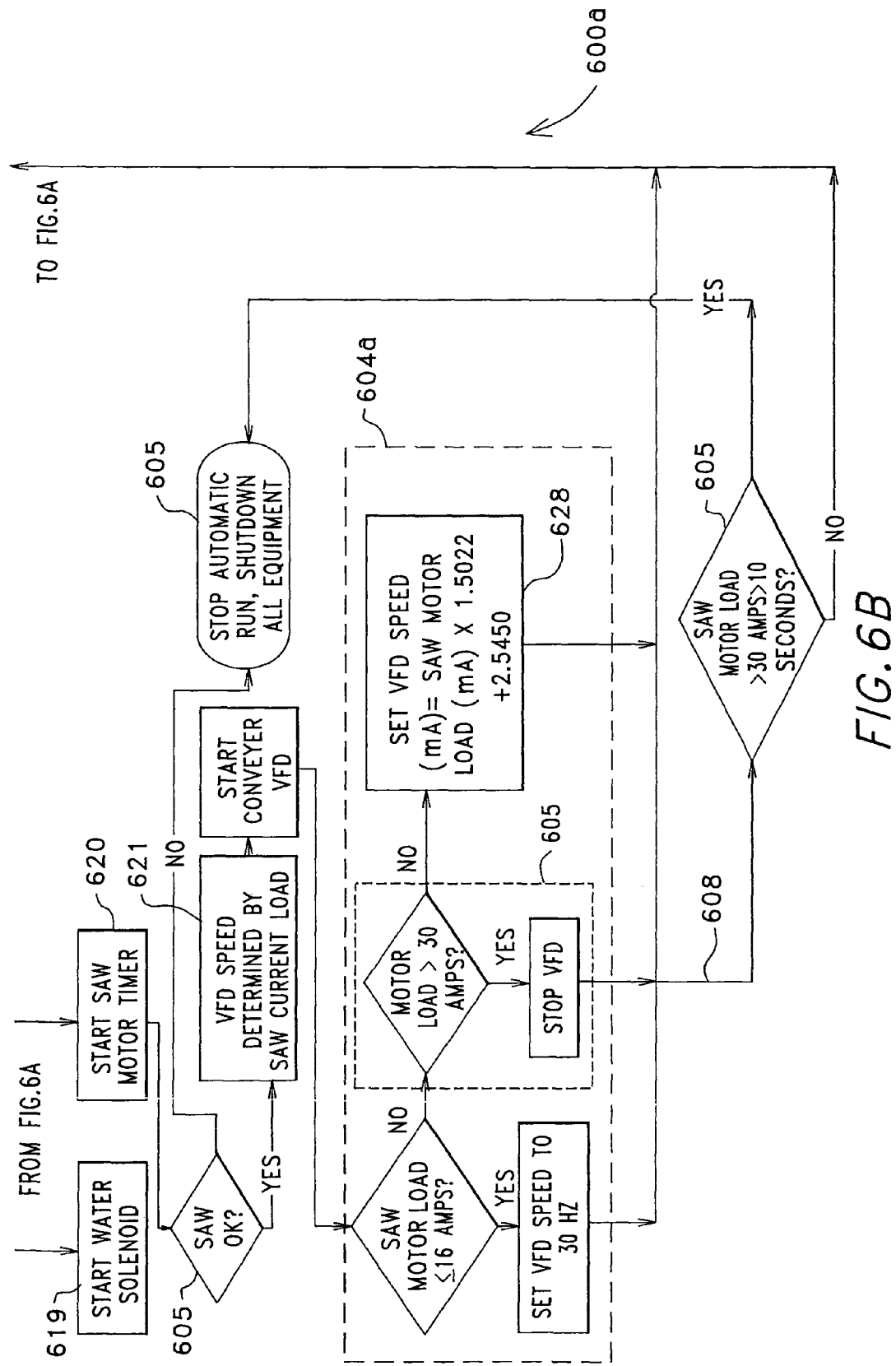
Figure 6C:
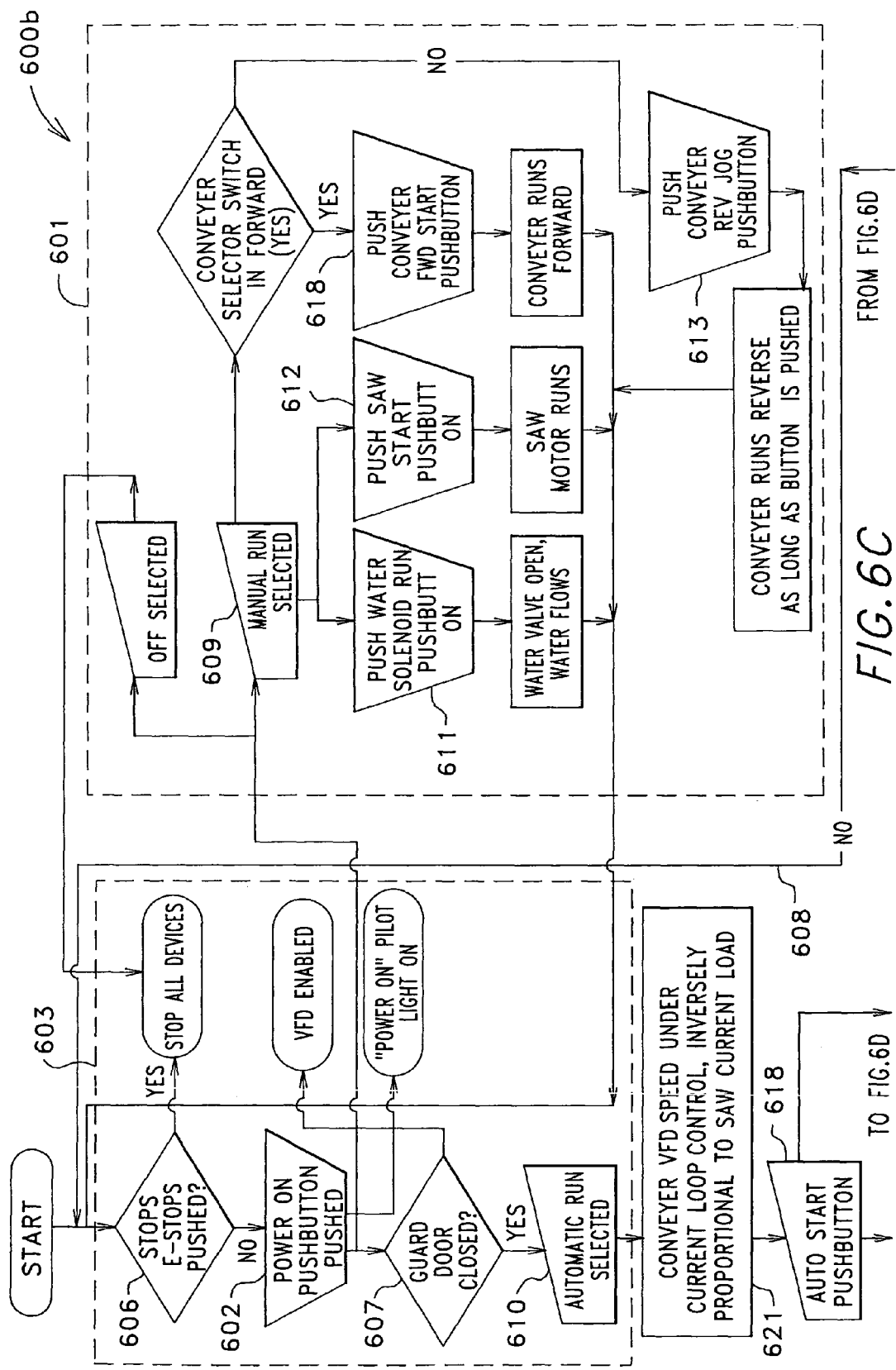
FIGS. 6c and 6d are a flowchart showing the control logic of an alternate embodiment of the present invention.
Figure 6D:
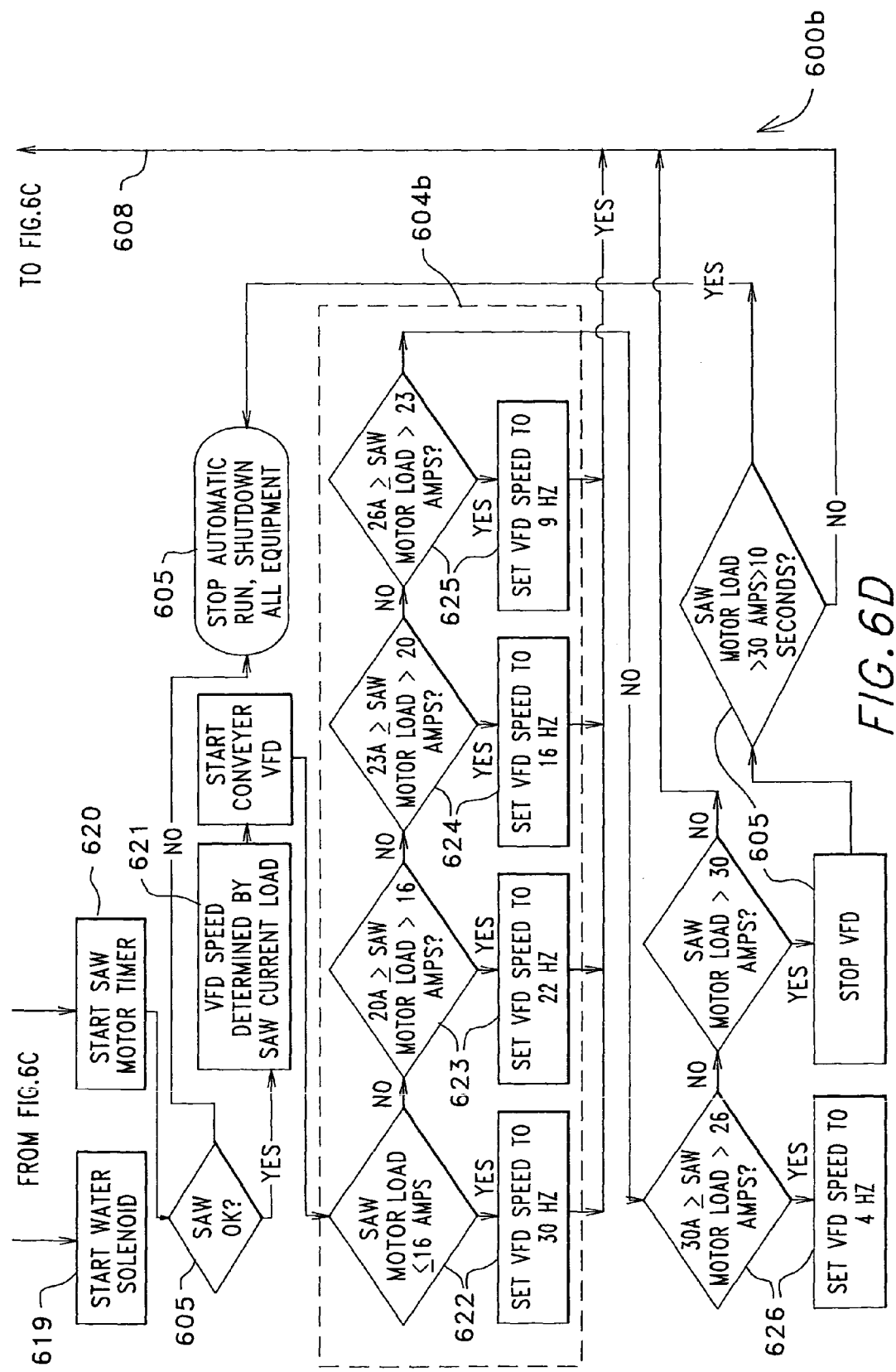
Figure 6E:
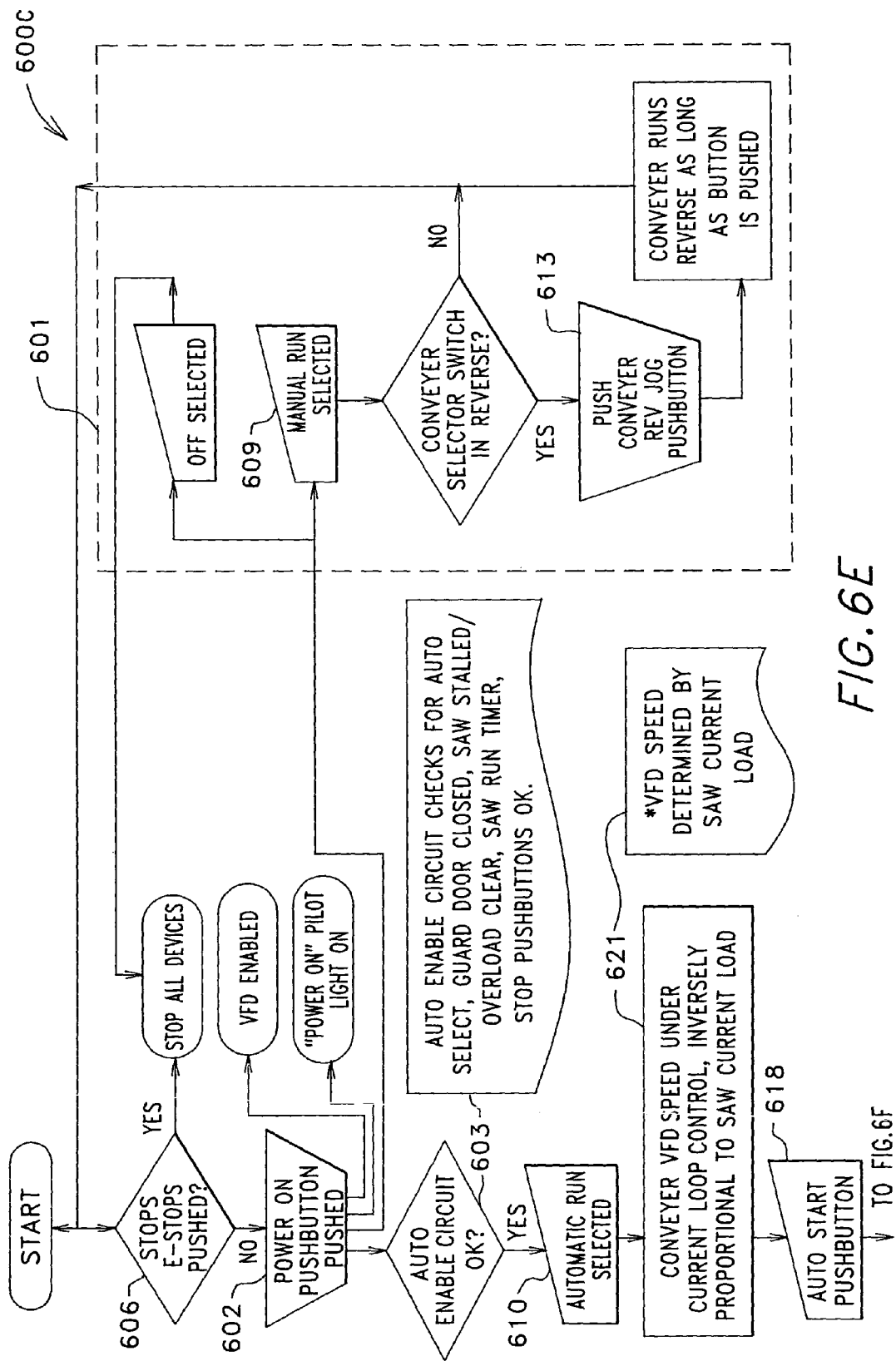
FIGS. 6e and 6f are a flowcharting showing the control logic of an alternate embodiment of the present invention.
Figure 6F:
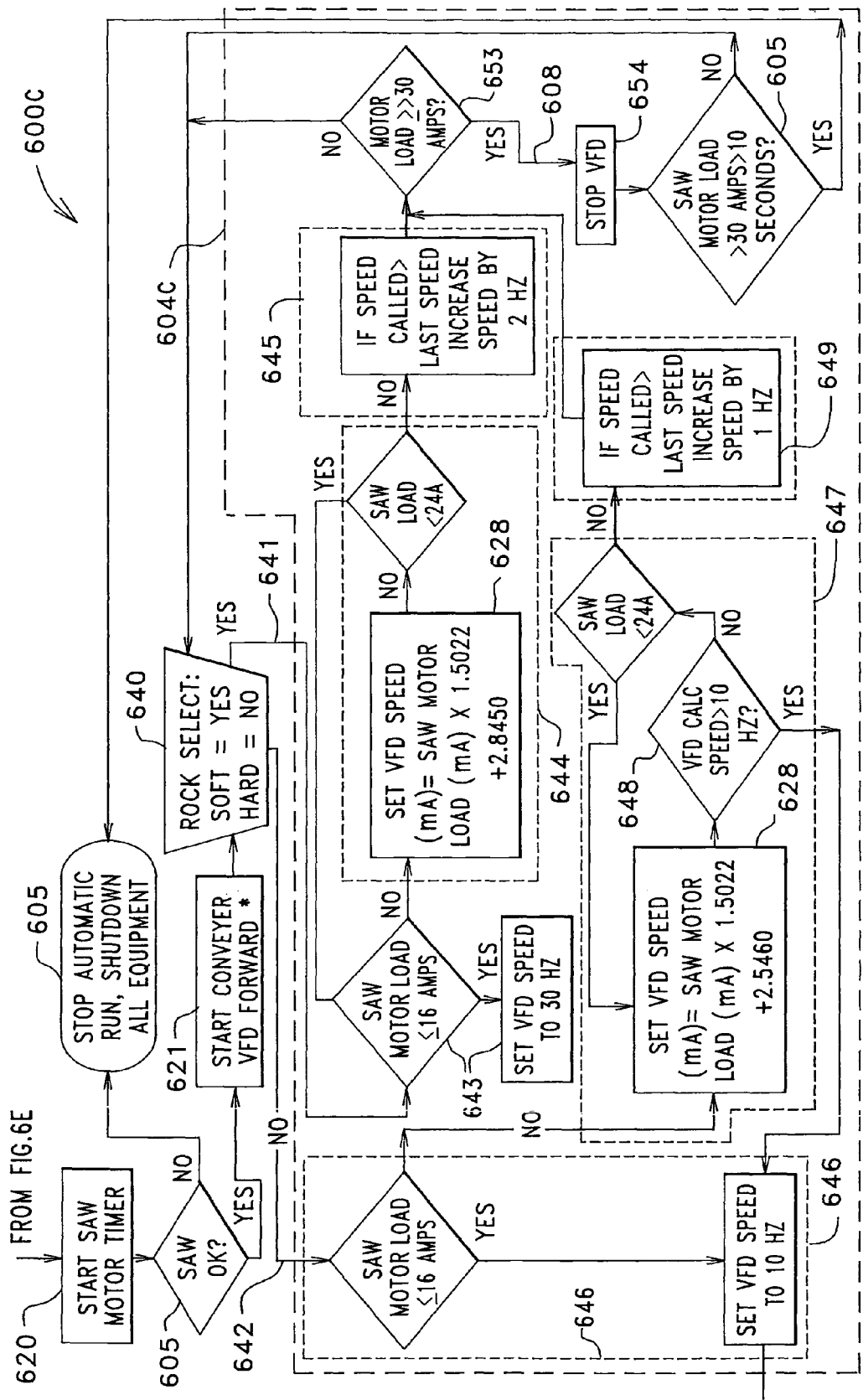
Figure 6G:
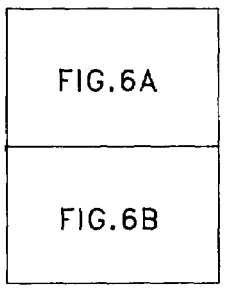
Figure 6H:
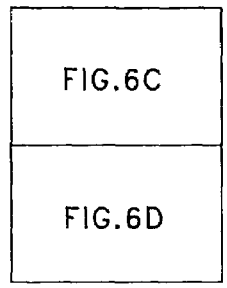
Figure 6I:
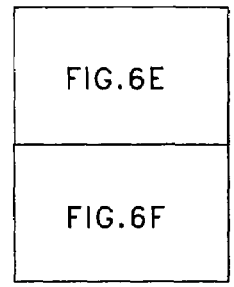

The manual operations are shown in box 601 of FIGS. 6*a*, 6*c* and 6*e*. The saw motor 5, 500, 1205 must be turned on by pressing saw start button 1106 as indicated by box 612 FIGS. 6*a* and 6*c*. Next, as indicated by box 618, the conveyor forward start button 1109 is pushed, starting the conveyors moving toward the blade. The conveyors are stopped by pressing conveyor forward stop button 1110.

In the manual mode the speed of the conveyors in either forward or reverse is not controlled by the load on the saw motor, the conveyors are run at one continuous speed.

The conveyors can be run in reverse in the manual mode, this is provided to allow the operator to clear a jam or any debris out of the path of the blade. The conveyors can be set to run continuously in reverse by switching conveyor direction switch 1107 to reverse if one is provided. The conveyors can also be temporarily run in reverse by holding down conveyor jog button 1110, in which case the conveyors will run in reverse as long as the button 1110 is held down, as indicated on flowcharts 600 by box 613.

In some operation conditions, it may be desirable to not allow manual forward operation, but only reverse operation to clear jams. In some cases the operators may try to clear to a jam by manually running the saw forward, instead of reversing the saw to pull the blockage. This is particularly likely if the jam occurs near the end of a cutting operation for a particular rock A. Running the saw forward to try clear a jam can cause significant motor or blade wear. Therefore, in some operating conditions it may be desirable to either not have a forward manual mode, shown in FIG. 6*e*, or to require a supervisor override to allow it (not shown). This supervisor override could be as simple as placing a locked box over the controls, or could be a computer override requiring a password which could be entered either at the saw or remotely.

The automatic run is started by pressing the power on button 1101, as indicated at box 602 and ensuring that selector switch 1104 is set to automatic as indicated in box 610. Next the automatic start button 1111 is pushed, box 618 and the machine checks the status of the necessary machinery as shown in box 603. The machine, as shown in box 607 in FIGS. 6*a* and 6*c* and box 603 in FIG. 6*e*, checks if safety covers are closed in those embodiments with automatic safety covers. The conveyor motor 7, 700, 1207 is controlled by a variable frequency drive (VFD) 513, which allows the speed of the conveyors to be varied according to the information about the load on the saw motor as shown in box 604*a*, 604*b* and 604*c*. If the motor load on the saw is above the safety range for the particular motor the saw and the conveyors will automatically be shut down as shown in boxes 605 FIGS. 6*b*, 6*d* and 6*f*.

The automatic start button 1111 being pressed starts the saw motor timer, box 620 FIGS. 6*b*, 6*d* and 6*f*. The saw motor starts, moving the blade, and the load on the saw motor is determined, box 621 in all flowcharts 600. The saw motor timer box 620 controls the start of the VFD of the conveyors. This allows the saw to reach full speed before the conveyors start moving material to be cut to the blade.

In the embodiment shown in FIGS. 6*e*–*f*, an additional control option is shown. The control panel can have a rock hardness selector box 640, FIG. 6*f*. This allows the operator to select for the hardness of the rock (or other substance) to be cut. Two settings are shown, hard and soft. It would be possible to have more settings if desired. The selection of the conveyor speeds and motor loads for different types of substances could be determined by experimentation on the material to be cut and knowledge of one skilled in the art of industrial saws.

The conveyors are then moved forward at a rate of speed inversely proportional to the load on the saw motor, box 604 all, controlled by the conveyor variable speed drive 513 A 50 Amp maximum current sensor 504 determines the saw motor load and sends it to a 4–20 milliAmp current loop output device which sends the saw motor load current to the PLC analog input. A PLC analog output card, 4–20 milliAmp current loop to the variable frequency drive 513 is the current loop speed control input.

There is a range of operational conditions set for the saw motor and the conveyors, boxes 604*a*, 604*b* and 604*c*, which will be determined by the exact equipment used and the material to be cut by the saw. Normally, these operational conditions will be set into the machine and are not easily variable. However, if desired, a programmable capability could be built into the present invention to allow the operator to set the operating conditions. This might be particularly advantageous in a large embodiment of the present invention that might be cutting a wide variety of materials and a wide range of sizes and thicknesses of material.

The speed of the conveyor is controlled in the preferred embodiment on a mathematical curve relating to the motor load, as shown in box 628 in FIGS. 6*a* and 6*c*. The algorithm of the curve is as follows:

The PLC program uses a "Scale" instruction to produce a certain output to the VFD speed control determined by the saw motor load. The Rate is −15022 and the offset is 25450, which is the slope of the saw motor load vs. the VFD speed. The −15022 (Rate) is the result of the range of the input divided by the range of the output (11750–5020)/(9120–13600)=6730/−4480=−1.5022 and is multiplied by 1000. These values are in engineering units, and represent the actual milliAmp input and output (times 1000). The 11750 represents the maximum current to send to the VFD for the desired maximum speed set point of 30 hertz. The 5020 is the minimum current to send to the VFD for the desired minimum (except for 0) speed of 4 hertz. The 9120 represents the minimum saw motor load current of 16 amps at which it is desirable to start decreasing the speed of the conveyor. The 13600 is the maximum saw motor load current of 30 amps at which the conveyor feed reduced to a minimum until the load decreases again. The negative Rate means that as one parameter goes up, the controlled parameter goes down, an inverse relationship.

The 25450 (Offset) is the scaled minimum (minimum speed current output)−input minimum (minimum saw load current)×slope (Rate figured above) as shown in box 628.

Box 604c of FIGS. 6e and 6f shows the details of the control logic in an embodiment with a rock hardness selector 640. If the hardness is set to soft, line 641, the conveyors will move faster in relation to the motor load. If the hardness is set to hard, line 642, the conveyors will move slower in relation to the motor load.

When the hardness is set to soft line 641 if the saw motor load sensed is greater than or equal to 16 Amps, then the VDF is set to 30 Hz box 643. As shown in box 644, if the saw motor load sensed is greater than 16 Amps the speed is set using the algorithm in box 628. If the load is less than 24 Amps, then the speed is increased from its last value by 2 Hz until the saw load approaches 24 Hz. If the load is greater than 24 Amps then control returns to box 643.

When the hardness is set to hard, if the saw motor load is less than or equal to 16 Amps, then the VDF is set to 10 Hz box 646. As shown in box 647, if the saw load is greater than 16 Amps, but less than 30 Amps, then the speed is set using the algorithm in box 628. However, the speed is never set less than 10 Hz box 648. If the saw load is less than 24 Amps then the speed in increased by 1 Hz until the saw load approaches 24 Amps. If the load is greater than 24 Amps, then control returns to box 628.

In FIG. 6a, there is no rock hardness selector function and the VDF control logic in box 604a is the same as the soft setting control logic box 647 FIG. 6f.

In an alternate embodiment of the present invention shown in FIG. 6b there are five set speed setting of the conveyor speed, box 604. If the saw motor load is less than 16 amps, the VFD is set to 30 Hz, box 622. If the saw motor load is greater than 16 amps, but less than 20 amps, the VFD is set to 22 Hz, box 623. If the saw motor load is greater than 20 amps, but less than 23 amps, the VFD is set to 16 Hz, box 624. If the saw motor load is greater than 23 amps, but less than 26 amps, the VFD is set to 9 Hz, box 625. If the saw motor load is greater than 26 amps, but less than 30 amps, the VFD is set to 4 Hz, box 626. This embodiment provides a piece wise approximation of the inverse transfer function.

All of the examples of motor load and VDF and the exact conversion algorithm are given using the values for the currently preferred motors and drives and are given for demonstrative purposes and are provide by way of example and not of limitation. The values and algorithm could differ for different equipment and different material to be cut.

FIG. 15 is a graph showing the relationship of saw motor current (load) versus conveyor feed speed for hard and soft materials for the embodiment shown in FIGS. 6e and 6f. As shown in FIG. 6f, at conveyor start 621 the present invention reads hard/soft setting box 640. When soft material is selected the motor load is read by 504 (FIG. 5). If the motor load is less than the sixteen Amps minimum current 1516 decision box 643 sets the VFD speed to 30 Hz line segment 1502.

When rock A contacts the blade 4, as seen in FIGS. 3 and 14, motor current increases as seen in segment 1501 and conveyor variable speed drive is reduced by the slope of 1501 or $-13/7$ Amps/Hz. If the motor load is less than 24 Amps box 652, then the variable speed drive frequency is given by equation 1550. If motor current is greater than the minimum 16 Amps and less than nominal current, in this case 24 Amps, then box 643 adds 2 Hz to the last speed setting, increasing the system gain to the new line 1511. If the motor current is tested over 30 Amps (maximum) line 1530 and box 653 conveyors are stopped box 654.

If the motor current was less than 40-amps for 1.5 second or 30-amps for 10 seconds box 605 operation transfers to box 640. Operation resumes with calculating a new feed speed using equation 1550 in box 628. If current was greater than 40-amps for 1.5 second or 30-amps for 10 seconds then operation stops box 605 requiring a operator to clear the fault and restart the machine.

If speed calculation 1551 requests a speed increase, an additional 2-Hz offset is added for new transfer function 1552 line 1512. If new speed calculation 1551 requests no speed increase, the last speed is used. This continues until the nominal set current 1524 is exceeded in decision box 652 (FIG. 6f). A recalculation of a new feed speed is done using equation 1550. Algorithm 604 continuously servos feed speed maintain nominal cutting motor current thereby adapting to material-size and or harness variations.

If the hard material is selected, line 642, operation is the same as taught for soft above except for the following changes: Low current maximum drive frequency/speed 1522 is $1/3$ of 1502 (30 Hz) or 10 Hz. Adaptation offset frequency 1531 is 1 Hz. Hard material transfer function 1560 has a gain of $-3/7$ Amps/Hz and $118/7$ and Hz offset.

The actual motor currents and feed speeds are offered by way of example and not limitation. Values are offered by way of example taught are a function of the specific machine capacity, gear-box ratios and types of materials being cut. Algorithm 604 may be replaced with a dedicated PID (proportional integral derivative) controller if higher performance is required. A controller such as the Gefran model 2301 made by Gefran ISI Inc. of 8 Lowell Ave. Winchester, Mass. 01890 USA is offered by way of example. This way the system continuously servos to the nominal current thereby adapting to material size or hardness variations. Reduces stress on feed drive components, increases cutter life and smother operation. Fast acting over current fault protection increases machine safety. The fast acting servo taught above automatically reduces feed rates, reducing the chances for a catastrophic fault. A two material selector is offered by way of example and not limitation. The simple two material switch may be replaced with continuous controls for nominal current set point 1524, minimum current 1516, maximum speed 1522 and offset 1531 parameters.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

We claim:

1. An automatic rock saw comprising:
   a frame;
   a blade operatively attached to the frame;
   a blade motor mounted on the frame and operatively attached to the blade to power the blade;
   a first conveyor having rollers and a conveyor belt to convey material to be cut to the blade, said first conveyor mounted on the frame such that the conveyor belt is substantially perpendicular to the blade;
   a second conveyor having rollers and a conveyor belt to convey material to be cut to the blade, said second conveyor mounted on the frame substantially parallel to and distance D1 away from the blade and above the first conveyor;
   a conveyor motor mounted on the frame and operatively attached to the first and second conveyor to power the conveyors such that both conveyor run at the substantially the same speed;
   a sensor attached to the blade motor to detect load on the blade motor; and
   a controller to control the speed of the conveyor motor based on an inverse relation to the load on the blade motor.

2. The rock saw of claim 1, wherein the inverse relation of the load on the blade motor to the speed of the conveyor motor is: speed of conveyor motor (mA)=blade motor load (mA)×1.5022+2.5450.

3. The rock saw of claim 1 further comprising a holding mechanism to hold the material to be cut against the second conveyor as it is carried to the blade.

4. The rock saw of claim 3 wherein the holding mechanism further comprises:
   at least one holding arm having a first and second end;
   the holding arm being rotatably attached to the frame at the first end and located opposite the second conveyor and spring biased in the direction of the second conveyor; and
   a holder movably attached to the second end, said holder functioning to press the material to be cut against the second conveyor and allowing the material to move along the attachment.

5. The rock saw of claim 1 further comprising a water jet to clean the material of cutting debris after the material is cut by the blade.

6. The rock saw of claim 1 further comprising:
   a second blade and second blade motor operatively mounted on a blade frame;
   the blade frame pivotally attached to the frame such that the second blade is substantially perpendicular to the blade and substantially parallel to and above the first conveyor.

7. An automatic rock saw comprising:
   a frame;
   a circular blade means attached to the frame functioning to cut a desired material;
   a blade motor mounted on the frame and operatively attached to the blade to power the circular blade means;
   a first conveyor means substantially perpendicular to the circular blade means functioning to convey material to be cut to the circular blade means mounted on the frame;
   a second conveyor means to convey material to be cut to the circular blade means mounted on the frame substantially parallel to and distance D1 away from the circular blade means and above the first conveyor means;
   a conveyor motor mounted on the frame and operatively attached to the conveyors to power the conveyors such that both conveyor run at the same speed;
   a sensor means attached to the blade motor to detect load on the blade motor;
   a controller means connected to the sensor means to control the speed of the conveyor motor and functioning to vary the speed of the conveyor motor means based on the load on the blade motor.

8. The rock saw of claim 7 further comprising a holding means functioning to hold the material to be cut against the second conveyor means as it is carried to the circular blade means.

* * * * *